US011196485B2

(12) United States Patent
Maeda et al.

(10) Patent No.: US 11,196,485 B2
(45) Date of Patent: **\*Dec. 7, 2021**

(54) NETWORK SYSTEM, MANAGEMENT DEVICE, AND NETWORK DESIGN METHOD

(71) Applicant: FUJITSU LIMITED, Kawasaki (JP)

(72) Inventors: Taizo Maeda, Kawasaki (JP); Kosuke Komaki, Kawasaki (JP)

(73) Assignee: FUJITSU LIMITED, Kawasaki (JP)

( \* ) Notice: Subject to any disclaimer, the term of this patent is extended or adjusted under 35 U.S.C. 154(b) by 0 days.

This patent is subject to a terminal disclaimer.

(21) Appl. No.: 17/008,689

(22) Filed: Sep. 1, 2020

(65) Prior Publication Data

US 2021/0075506 A1 Mar. 11, 2021

(30) Foreign Application Priority Data

Sep. 6, 2019 (JP) .............................. JP2019-163229

(51) Int. Cl.
*H04B 10/61* (2013.01)
*H04B 10/079* (2013.01)
*H04J 14/02* (2006.01)
*H04B 10/516* (2013.01)

(52) U.S. Cl.
CPC ..... *H04B 10/07953* (2013.01); *H04B 10/516* (2013.01); *H04B 10/61* (2013.01); *H04J 14/0212* (2013.01)

(58) Field of Classification Search
CPC .............. H04B 10/07953; H04B 10/27; H04B 10/516; H04B 10/61; H04J 14/0212
See application file for complete search history.

(56) References Cited

U.S. PATENT DOCUMENTS

| 10,707,963 | B2 * | 7/2020 | Maeda ................... H04B 10/27 |
| 2010/0027988 | A1 | 2/2010 | Hoshida et al. |
| 2011/0135301 | A1 | 6/2011 | Myslinski et al. |

(Continued)

FOREIGN PATENT DOCUMENTS

| JP | 2005-64905 A | 3/2005 |
| JP | 2010-41108 A | 2/2010 |

OTHER PUBLICATIONS

U.S. Notice of Allowance dated Mar. 27, 2020 for copending U.S. Appl. No. 16/292,532, 10 pages.

(Continued)

*Primary Examiner* — Dzung D Tran
(74) *Attorney, Agent, or Firm* — Fujitsu Patent Center

(57) ABSTRACT

A network system includes a first device and a second device coupled to the first device. The second device configured to calculate a bandwidth of an optical signal narrowed by a wavelength filter from the number of wavelength filters on a transmission route of the optical signal, to select, based on a plurality of combinations of a degree of multilevel and the baud rate, and a correspondence between a lower limit value of a bandwidth of the optical signal and a lower limit value of an optical signal to noise ratio (OSNR) for maintaining predetermined quality of the optical signal, one or more first combinations from the plurality of combinations, to select a second combination from the one or more first combinations, and to set the degree of multilevel and the baud rate of the second combination in the first device.

17 Claims, 29 Drawing Sheets

| OPERATION MODE NUMBER | MODE PARAMETERS ||||| BAUD RATE [Gbaud] | BAND LIMIT VALUE(Bo) [GHz] | PENALTY [dB] | OSNR TOLERANCE [dB] |
|---|---|---|---|---|---|---|---|---|
| | BASIC MODULATION SCHEME | LINE RATE [Gbps] | FEC REDUNDANCY RATE [%] | DEGREE OF MULTILEVEL | | | | |
| #1 | 16QAM | 200 | 20 | 2.0 | 64.0 | 62.1 | 0.90 | 15.0 |
| #2 | 16QAM | 200 | 20 | 2.2 | 58.2 | 56.5 | 0.95 | 16.0 |
| #3 | 16QAM | 200 | 20 | 2.4 | 53.3 | 51.8 | 1.00 | 17.0 |
| #4 | 16QAM | 200 | 20 | 2.6 | 49.2 | 47.8 | 1.05 | 18.0 |
| #5 | 16QAM | 200 | 20 | 2.8 | 45.7 | 44.4 | 1.10 | 19.0 |
| #6 | 16QAM | 200 | 20 | 3.0 | 42.7 | 41.4 | 1.15 | 20.0 |
| #7 | 16QAM | 200 | 20 | 3.2 | 40.0 | 38.8 | 1.20 | 21.0 |
| #8 | 16QAM | 200 | 20 | 3.4 | 37.6 | 36.6 | 1.25 | 22.0 |
| #9 | 16QAM | 200 | 20 | 3.6 | 35.6 | 34.5 | 1.30 | 23.0 |
| #10 | 16QAM | 200 | 20 | 3.8 | 33.7 | 32.7 | 1.35 | 24.0 |
| #11 | 16QAM | 200 | 20 | 4.0 | 32.0 | 31.1 | 1.40 | 25.0 |
| #12 | 16QAM | 300 | 20 | 2.8 | 68.6 | 66.6 | 1.10 | 20.0 |
| #13 | 16QAM | 300 | 20 | 3.0 | 64.0 | 62.1 | 1.15 | 21.0 |
| #14 | 16QAM | 300 | 20 | 3.2 | 60.0 | 58.3 | 1.20 | 22.0 |
| #15 | 16QAM | 300 | 20 | 3.4 | 56.5 | 54.8 | 1.25 | 23.0 |
| #16 | 16QAM | 300 | 20 | 3.6 | 53.3 | 51.8 | 1.30 | 24.0 |
| #17 | 16QAM | 300 | 20 | 3.8 | 50.5 | 49.1 | 1.35 | 25.0 |
| #18 | 16QAM | 300 | 20 | 4.0 | 48.0 | 46.6 | 1.40 | 26.0 |
| #19 | 64QAM | 400 | 20 | 3.6 | 71.1 | 69.0 | 1.00 | 25.0 |
| #20 | 64QAM | 400 | 20 | 3.8 | 67.4 | 65.4 | 1.05 | 26.0 |
| #21 | 64QAM | 400 | 20 | 4.0 | 64.0 | 62.1 | 1.10 | 27.0 |
| #22 | 64QAM | 400 | 20 | 4.2 | 61.0 | 59.2 | 1.15 | 28.0 |
| #23 | 64QAM | 400 | 20 | 4.4 | 58.2 | 56.5 | 1.20 | 29.0 |
| #24 | 64QAM | 400 | 20 | 4.6 | 55.7 | 54.0 | 1.25 | 30.0 |
| #25 | 64QAM | 400 | 20 | 4.8 | 53.3 | 51.8 | 1.30 | 31.0 |
| #26 | 64QAM | 400 | 20 | 5.0 | 51.2 | 49.7 | 1.35 | 32.0 |

(56) References Cited

U.S. PATENT DOCUMENTS

| | | |
|---|---|---|
| 2012/0213522 A1 | 8/2012 | Zhang et al. |
| 2015/0139652 A1 | 5/2015 | Bottari et al. |
| 2015/0162980 A1 | 6/2015 | Cavaliere |
| 2016/0050470 A1 | 2/2016 | Swinkels et al. |
| 2017/0250758 A1* | 8/2017 | Kikuchi ................. H04B 10/54 |
| 2020/0052794 A1* | 2/2020 | Noguchi ............. H04J 14/0224 |
| 2020/0067624 A1* | 2/2020 | Tsuzuki ............. H04J 14/0267 |

OTHER PUBLICATIONS

U.S. Office Action dated Sep. 19, 2019 for copending U.S. Appl. No. 16/292,532, 17 pages.

\* cited by examiner

FIG. 3
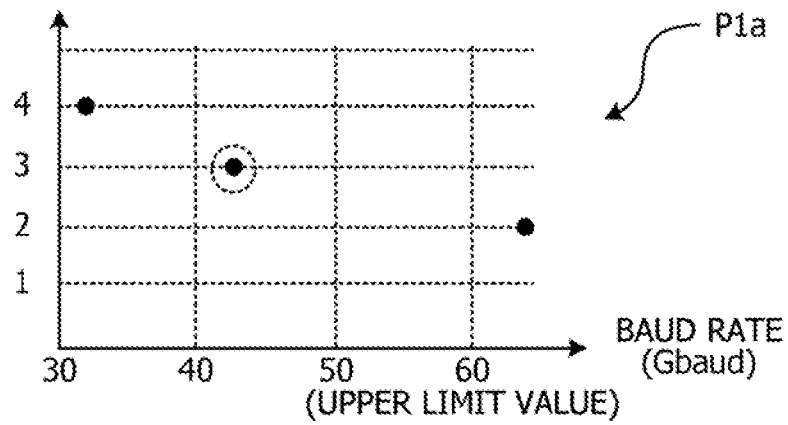
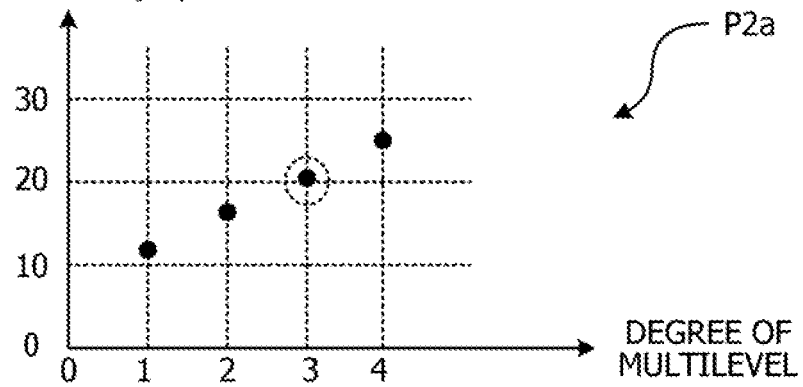
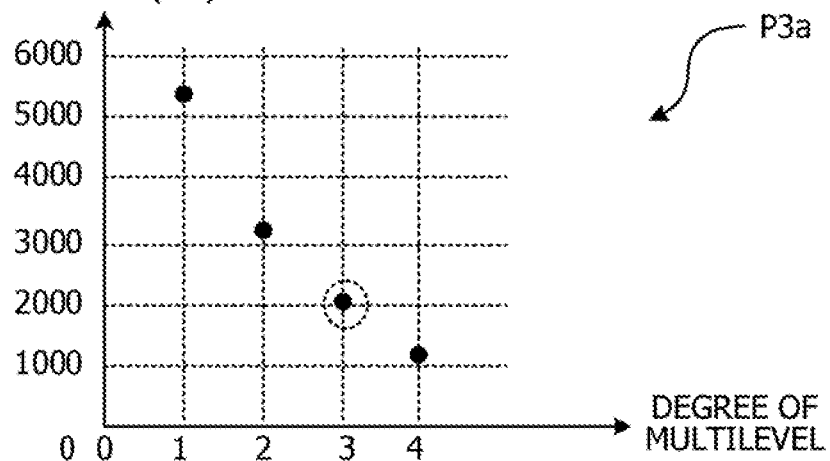

FIG. 5
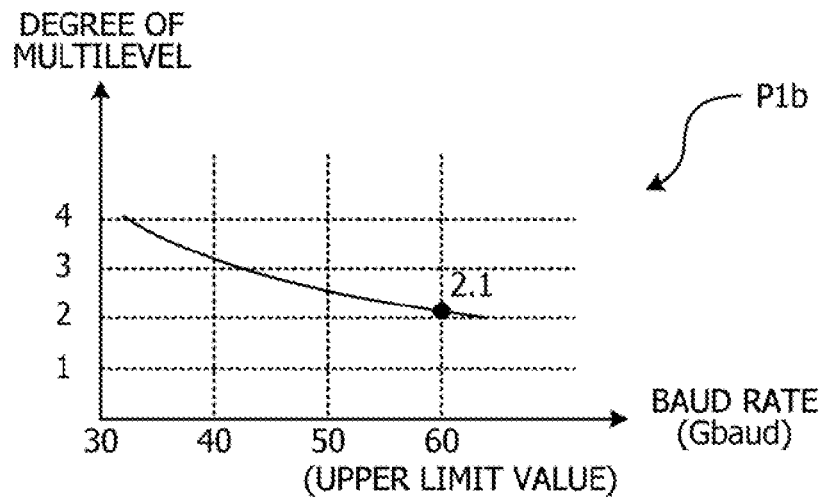
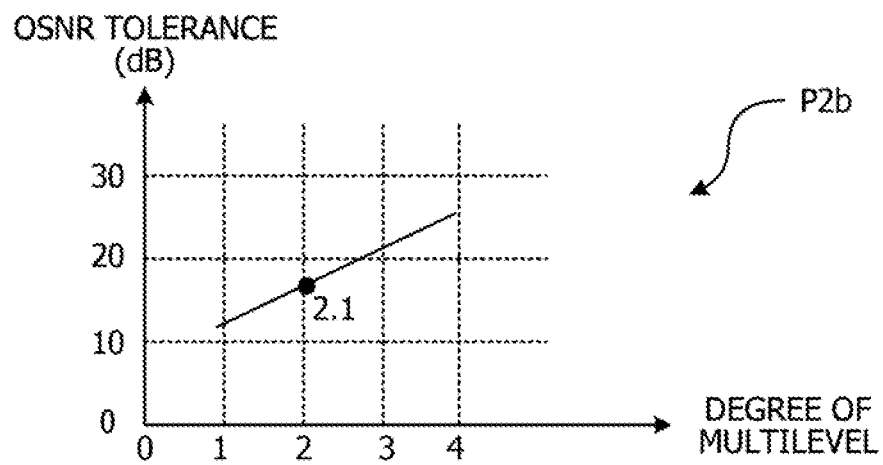
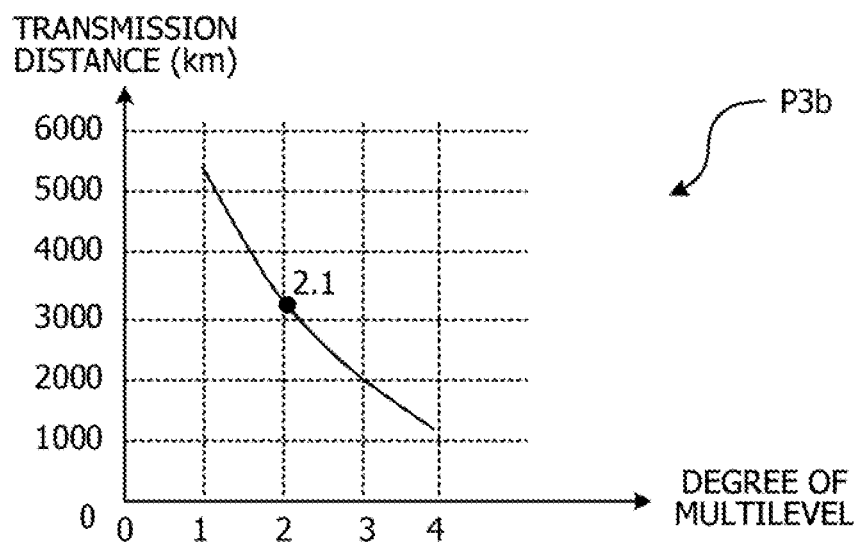

FIG. 14

| OPERATION MODE NUMBER | MODE PARAMETERS | | | | | BAUD RATE [Gbaud] | BAND LIMIT VALUE(Bo) [GHz] | PENALTY [dB] | OSNR TOLERANCE [dB] |
|---|---|---|---|---|---|---|---|---|---|
| | BASIC MODULATION SCHEME | LINE RATE [Gbps] | FEC REDUNDANCY RATE [%] | DEGREE OF MULTILEVEL | | | | | |
| #1 | 16QAM | 200 | 20 | 2.0 | | 64.0 | 62.1 | 0.90 | 15.0 |
| #2 | 16QAM | 200 | 20 | 2.2 | | 58.2 | 56.5 | 0.95 | 16.0 |
| #3 | 16QAM | 200 | 20 | 2.4 | | 53.3 | 51.8 | 1.00 | 17.0 |
| #4 | 16QAM | 200 | 20 | 2.6 | | 49.2 | 47.8 | 1.05 | 18.0 |
| #5 | 16QAM | 200 | 20 | 2.8 | | 45.7 | 44.4 | 1.10 | 19.0 |
| #6 | 16QAM | 200 | 20 | 3.0 | | 42.7 | 41.4 | 1.15 | 20.0 |
| #7 | 16QAM | 200 | 20 | 3.2 | | 40.0 | 38.8 | 1.20 | 21.0 |
| #8 | 16QAM | 200 | 20 | 3.4 | | 37.6 | 36.6 | 1.25 | 22.0 |
| #9 | 16QAM | 200 | 20 | 3.6 | | 35.6 | 34.5 | 1.30 | 23.0 |
| #10 | 16QAM | 200 | 20 | 3.8 | | 33.7 | 32.7 | 1.35 | 24.0 |
| #11 | 16QAM | 200 | 20 | 4.0 | | 32.0 | 31.1 | 1.40 | 25.0 |
| #12 | 16QAM | 300 | 20 | 2.8 | | 68.6 | 66.6 | 1.10 | 20.0 |
| #13 | 16QAM | 300 | 20 | 3.0 | | 64.0 | 62.1 | 1.15 | 21.0 |
| #14 | 16QAM | 300 | 20 | 3.2 | | 60.0 | 58.3 | 1.20 | 22.0 |
| #15 | 16QAM | 300 | 20 | 3.4 | | 56.5 | 54.8 | 1.25 | 23.0 |
| #16 | 16QAM | 300 | 20 | 3.6 | | 53.3 | 51.8 | 1.30 | 24.0 |
| #17 | 16QAM | 300 | 20 | 3.8 | | 50.5 | 49.1 | 1.35 | 25.0 |
| #18 | 16QAM | 300 | 20 | 4.0 | | 48.0 | 46.6 | 1.40 | 26.0 |
| #19 | 64QAM | 400 | 20 | 3.6 | | 71.1 | 69.0 | 1.00 | 25.0 |
| #20 | 64QAM | 400 | 20 | 3.8 | | 67.4 | 65.4 | 1.05 | 26.0 |
| #21 | 64QAM | 400 | 20 | 4.0 | | 64.0 | 62.1 | 1.10 | 27.0 |
| #22 | 64QAM | 400 | 20 | 4.2 | | 61.0 | 59.2 | 1.15 | 28.0 |
| #23 | 64QAM | 400 | 20 | 4.4 | | 58.2 | 56.5 | 1.20 | 29.0 |
| #24 | 64QAM | 400 | 20 | 4.6 | | 55.7 | 54.0 | 1.25 | 30.0 |
| #25 | 64QAM | 400 | 20 | 4.8 | | 53.3 | 51.8 | 1.30 | 31.0 |
| #26 | 64QAM | 400 | 20 | 5.0 | | 51.2 | 49.7 | 1.35 | 32.0 |

FIG. 15

| OPERATION MODE NUMBER | DEGREE OF MULTILEVEL | BDM#1 | | | BDM#2 | | | CALCULATION EXPRESSION |
|---|---|---|---|---|---|---|---|---|
| | | NUMBER OF BITS ON INPUT SIDE | NUMBER OF BITS ON OUTPUT SIDE | CONVERSION RATE | NUMBER OF BITS ON INPUT SIDE | NUMBER OF BITS ON OUTPUT SIDE | CONVERSION RATE | |
| #1 | 2.0 | 0 | 10 | 0 | - | - | - | (10+0)×2[BITS]/10[SYMBOLS] |
| #2 | 2.2 | 1 | 10 | 0.1 | - | - | - | (10+1)×2[BITS]/10[SYMBOL] |
| #3 | 2.4 | 2 | 10 | 0.2 | - | - | - | (10+2)×2[BITS]/10[SYMBOL] |
| #4 | 2.6 | 3 | 10 | 0.3 | - | - | - | (10+3)×2[BITS]/10[SYMBOL] |
| #5 | 2.8 | 4 | 10 | 0.4 | - | - | - | (10+4)×2[BITS]/10[SYMBOL] |
| #6 | 3.0 | 5 | 10 | 0.5 | - | - | - | (10+5)×2[BITS]/10[SYMBOL] |
| #7 | 3.2 | 6 | 10 | 0.6 | - | - | - | (10+6)×2[BITS]/10[SYMBOL] |
| #8 | 3.4 | 7 | 10 | 0.7 | - | - | - | (10+7)×2[BITS]/10[SYMBOL] |
| #9 | 3.6 | 8 | 10 | 0.8 | - | - | - | (10+8)×2[BITS]/10[SYMBOL] |
| #10 | 3.8 | 9 | 10 | 0.9 | - | - | - | (10+9)×2[BITS]/10[SYMBOL] |
| #11 | 4.0 | 10 | 10 | 1 | - | - | - | (10+10)×2[BITS]/10[SYMBOLS] |
| ... | | | | | | | | |
| #19 | 3.6 | 4 | 10 | 0.4 | 4 | 10 | 0.4 | (10+4+4)×2[BITS]/10[SYMBOL] |
| #20 | 3.8 | 5 | 10 | 0.5 | 4 | 10 | 0.4 | (10+5+4)×2[BITS]/10[SYMBOL] |
| #21 | 4.0 | 5 | 10 | 0.5 | 5 | 10 | 0.5 | (10+5+5)×2[BITS]/10[SYMBOL] |
| #22 | 4.2 | 6 | 10 | 0.6 | 5 | 10 | 0.5 | (10+6+5)×2[BITS]/10[SYMBOL] |
| #23 | 4.4 | 6 | 10 | 0.6 | 6 | 10 | 0.6 | (10+6+6)×2[BITS]/10[SYMBOL] |
| #24 | 4.6 | 7 | 10 | 0.7 | 6 | 10 | 0.6 | (10+7+6)×2[BITS]/10[SYMBOL] |
| #25 | 4.8 | 7 | 10 | 0.7 | 7 | 10 | 0.7 | (10+7+7)×2[BITS]/10[SYMBOL] |
| #26 | 5.0 | 8 | 10 | 0.8 | 7 | 10 | 0.7 | (10+8+7)×2[BITS]/10[SYMBOL] |

NETWORK SYSTEM, MANAGEMENT DEVICE, AND NETWORK DESIGN METHOD

CROSS-REFERENCE TO RELATED APPLICATION

This application is based upon and claims the benefit of priority of the prior Japanese Patent Application No. 2019-163229, filed on Sep. 6, 2019, the entire contents of which are incorporated herein by reference.

FIELD

The embodiments discussed herein are related to a network system, management device, and a network design method.

BACKGROUND

As a transmission system of a transmission device, for example, there is a digital coherent optical transmission system. In the digital coherent optical transmission system, a multilevel modulation scheme of an optical signal is set in the transmission device according to a transmission rate (line rate) of the optical signal when a baud rate is fixed.

For example, when the baud rate is about 32 (Gbaud) and the line rate is 100 (Gbps), dual polarization (DP)—quadrature phase shift keying (QPSK) is selected as a modulation scheme. When the line rate is 200 (Gbps), DP—16 quadrature amplitude modulation (QAM) is selected as the modulation scheme.

In recent years, due to improvements in the performance of digital signal processing units (DSPs), analog-to-digital converters, and digital-to-analog converters, transmission devices capable of changing a baud rate within a range of, for example, 32 to 64 (Gbaud) have been researched and developed. In this type of transmission device, it is demanded to select and set an optimum combination of a baud rate and a multilevel modulation scheme from the viewpoint of optical transmission characteristics. For example, Japanese Laid-open Patent Publication No. 2005-64905 describes that the compensation operation of the optical transmission characteristics is controlled using a Q factor.

SUMMARY

According to an aspect of the embodiments, a network system includes a first device configured to determine a modulation scheme based on a degree of multilevel and a variable baud rate, and to transmit an optical signal, and a second device coupled to the first device and configured to calculate a bandwidth of the optical signal narrowed by a wavelength filter from the number of wavelength filters on a transmission route of the optical signal, select, based on a plurality of combinations of the degree of multilevel and the baud rate according to a transmission rate of the optical signal, and a correspondence between a lower limit value of a bandwidth of the optical signal and a lower limit value of an optical signal to noise ratio (OSNR) for maintaining predetermined quality of the optical signal when the degree of multilevel and the baud rate are set in the first device, one or more first combinations in each of which the lower limit value of the bandwidth is equal to or less than the bandwidth of the narrowed optical signal from the plurality of combinations, select a second combination from the one or more first combinations based on the lower limit value of the OSNR or the baud rate, and set the degree of multilevel and the baud rate of the second combination in the first device.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a diagram illustrating an example of selection of a degree of multilevel in a comparative example;

FIG. 5 is a diagram illustrating an example of selection of a degree of multilevel in an embodiment;

FIG. 14 is a diagram illustrating an example of a communication setting database;

FIG. 15 is a diagram illustrating a calculation example of a degree of multilevel;

DESCRIPTION OF EMBODIMENTS

As a degree of multilevel of the multilevel modulation scheme increases, a distance between symbols in a constellation of an optical signal decreases. Therefore, there is no margin in a phase and amplitude of a receiving side optical signal, and the tolerance to an optical signal to noise ratio (OSNR) deteriorates due to the influence of noise from an optical amplifier or the like. On the other hand, it is possible to select a multilevel modulation scheme having a small degree of multilevel so that the OSNR tolerance is sufficient. However, as the degree of multilevel decreases, the number of bits per symbol decreases. Therefore, in order to realize a predetermined line rate, a high baud rate is demanded to set.

However, as the baud rate increases, a bandwidth of the optical signal (spectrum) increases, and thus, for example, the influence of pass band narrowing (PBN) due to a wavelength filter of a wavelength selective switch (WSS) on a transmission route of the optical signal increases. As described above, since there is a trade-off between the baud rate and the multilevel modulation scheme, it is difficult to select an optimum combination of the baud rate and the multilevel modulation scheme.

When the degree of multilevel of the multilevel modulation scheme is a positive integer, options of the degree of multilevel satisfying the conditions for the OSNR tolerance and the pass band narrowing are limited, and thus there is a problem in that the transmission distance is insufficient.

It is an object of the embodiments to provide a network system and a network design program capable of performing appropriate network design in consideration of pass band narrowing, OSNR, and transmission distance.

(Configuration of Network System)

Figure 1:
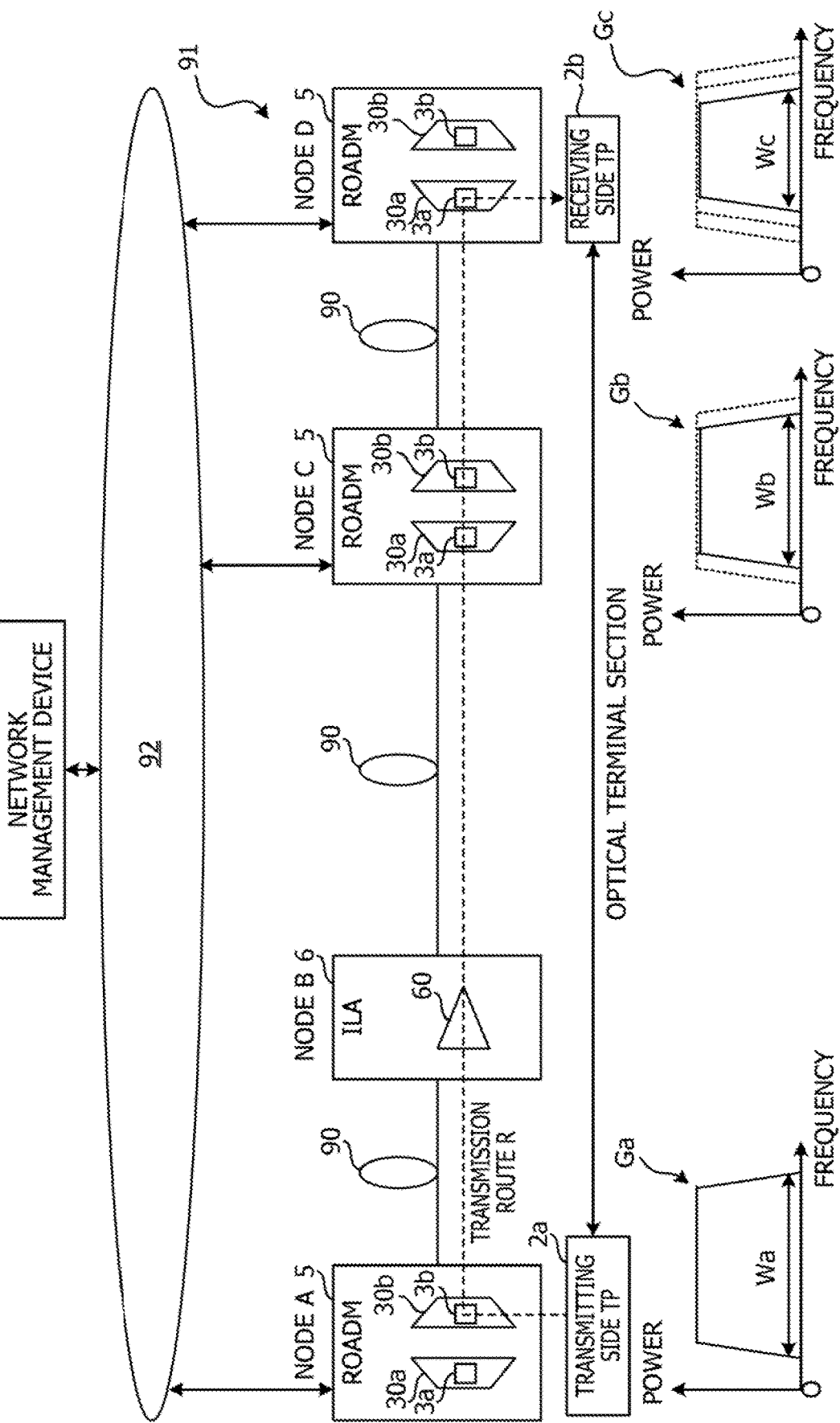
FIG. 1 is a configuration diagram illustrating an example of a network system.

FIG. 1 is a configuration diagram illustrating an example of a network system. The network system includes a WDM network 91 and a network management device 1 that monitors and controls the WDM network 91.

The WDM network 91 includes nodes A to D coupled to each other by a transmission path 90 such as an optical fiber. Each of the nodes A, C, and D is provided with a ROADM 5 for performing wavelength multiplex optical communication, and the node B is provided with an inline amplifier (ILA) 6.

Each the ROADM 5 is coupled to the network management device 1 via a control network 92 such as a local area network (LAN). The network management device 1 designs a transmission route R of an optical signal of the WDM network 91 and sets a multilevel modulation scheme, an FEC redundancy rate, and a baud rate of the optical signal for each ROADM 5.

In this example of FIG. 1, the optical signal is transmitted by a digital coherent optical transmission system along a transmission route R passing through the nodes A to D in this order as indicated by a dotted line. At the start node A, a transmitting side transponder (TP) 2a transmits an optical signal to the ROADM 5, and at the end node D, a receiving side transponder (TP) 2b receives the optical signal from the ROADM 5. Each ROADM 5 includes an input side wavelength selective switch (WSS) 30a and an output side wavelength selective switch 30b that add, drop, and pass an optical signal in units of wavelength.

The optical signal from the transmitting side TP 2a is added by the output side WSS 30b and inputted to the ILA 6 of the node B. The ILA 6 is provided with, for example, an Erbium Doped Fiber Amplifier (EDFA) 60, and the optical signal is passed through the EDFA 60 and is inputted to the ROADM 5 of the node C. The optical signal is passed through the input side and output side WSSs 30a and 30b in the ROADM 5 of the node C and is inputted to the ROADM 5 of the node D. At the node D, the optical signal is dropped by the input side WSS 30a and inputted to the receiving side TP 2b.

In the following description, a section in which an optical signal is transmitted without being converted into an electrical signal is referred to as an "optical terminal section". In this example of FIG. 1, the optical terminal section is a section from the node A where the transmitting side TP 2a is located to the node D where the receiving side TP 2b is located.

The input side and output side WSSs 30a and 30b are respectively provided with wavelength filters 3a and 3b in units of wavelength for extracting predetermined wavelength light from a wavelength multiplexed optical signal in which a plurality of pieces of wavelength light is multiplexed. Therefore, a band of the optical signal is narrowed each time the optical signal is passed through the input side and output side WSSs 30a and 30b.

Reference symbol Ga indicates an example of a spectrum waveform of an optical signal outputted from the transmitting side TP 2a at the node A. The optical signal has a bandwidth Wa corresponding to a baud rate of the transmitting side TP 2a.

Reference symbol Gb indicates an example of a spectrum waveform of an optical signal outputted from the ROADM 5 at the node C. The band of the optical signal is narrowed by passing through the wavelength filter 3b of the output side WSS 30b of the node A and the wavelength filters 3a and 3b of the input side and output side WSSs 30a and 30b of the node C. Therefore, a bandwidth Wb of the optical signal is narrower than the bandwidth Wa of the node A.

Reference symbol Gc indicates an example of a spectrum waveform of an optical signal outputted from the ROADM 5 at the node D. The band of the optical signal is narrowed by passing through the wavelength filter 3a of the input side WSS 30a of the node D. Therefore, a bandwidth Wc of the optical signal is narrower than the bandwidth Wb of the node C. Since the bandwidth of the optical signal increases as the baud rate increases, the effect of narrowing also increases.

The quality of the optical signal is determined not only by the narrowing of the band but also by the OSNR at the receiving side TP 2b. The OSNR changes according to a degree of multilevel of the multilevel modulation scheme of the optical signal.

Figure 2:
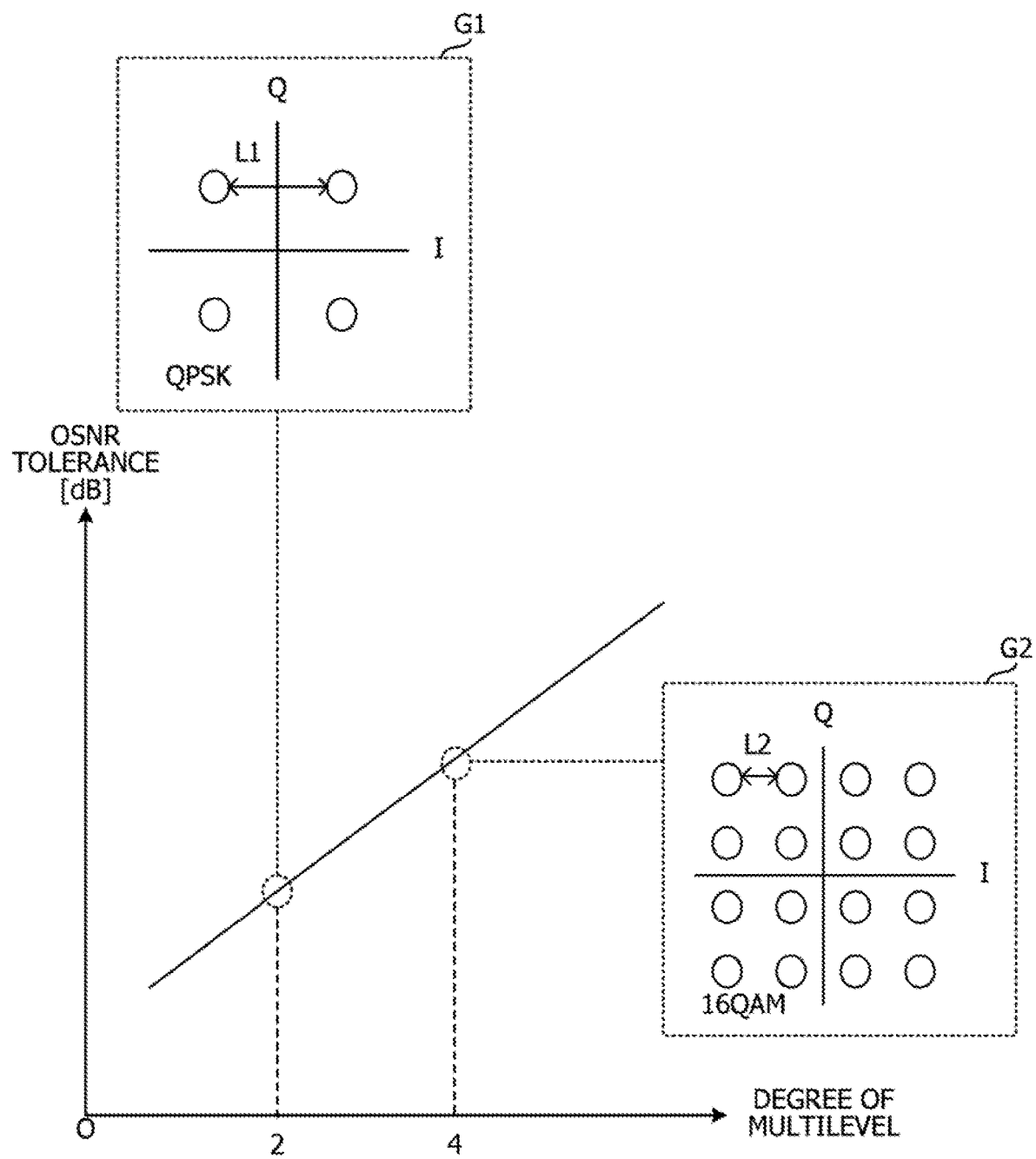
FIG. 2 is a diagram illustrating an example of a change in OSNR tolerance for a degree of multilevel.

FIG. 2 is a diagram illustrating an example of a change in OSNR tolerance for a degree of multilevel. In FIG. 2, the horizontal axis represents the degree of multilevel, and the vertical axis represents the OSNR tolerance (dB). The OSNR tolerance is a lower limit value of the OSNR (for example, a limit value of error correction) demanded to set a bit error rate of the optical signal to zero or less. Therefore, the lower the OSNR tolerance, the higher the quality of the optical signal.

The OSNR tolerance increases (for example, deteriorates) as the degree of multilevel increases. This is because the OSNR tolerance increases as the distance between symbols in a constellation of the optical signal decreases.

Reference symbol G1 indicates an example of a QPSK constellation having a degree of multilevel of two, and reference symbol G2 indicates an example of a 16 QAM constellation having a degree of multilevel of four. A distance L2 between symbols in the 16 QAM constellation is narrower than a distance L1 between symbols in the QPSK constellation. Therefore, the OSNR tolerance in the case of 16 QAM is higher than the OSNR tolerance in the case of QPSK.

As described above, as the degree of multilevel of the multilevel modulation scheme increases, the distance between the symbols in the constellation of the optical signal decreases. Therefore, there is no margin in a phase and amplitude of the receiving side optical signal, and the OSNR tolerance deteriorates due to the influence of noise from the ILA 6 or the like. On the other hand, it is possible to select a multilevel modulation scheme having a small degree of multilevel so that the OSNR tolerance is sufficient. However, as the degree of multilevel decreases, the number of bits per symbol decreases. Therefore, in order to realize a predetermined line rate, a high baud rate is demanded to set.

However, as the baud rate increases, the bandwidth of the optical signal increases as described above. Therefore, for example, the influence of pass band narrowing by the wavelength filters 3a and 3b of the WSSs 30a and 30b on the transmission route of the optical signal increases. As described above, since there is a trade-off between the baud rate and the multilevel modulation scheme, it is difficult for the person in charge of network design to manually select an optimum combination of the baud rate and the multilevel modulation scheme.

When the degree of multilevel of the multilevel modulation scheme is a positive integer, options of the degree of multilevel satisfying the conditions for the OSNR tolerance and the pass band narrowing are limited, and thus there is a problem in that the transmission distance is insufficient.

FIG. 3 is a diagram illustrating an example of selection of a degree of multilevel in a comparative example. In this example, the degree of multilevel is selected from "1", "2", "3", and "4". Therefore, the multilevel modulation scheme is binary phase shift keying (BPSK) when the degree of multilevel is "1", QPSK when the degree of multilevel is "2", 8 QAM when the degree of multilevel is "3", and 16 QAM when the degree of multilevel is "4".

In this example, it is assumed that the line rate of the optical signal is 200 (Gbps), and an upper limit value of the baud rate in consideration of pass band narrowing by the optical filter on the route of the optical signal is 60 (Gbaud).

Reference symbol P1a indicates an example of a change in the degree of multilevel for the baud rate. Within a range equal to or less than the upper limit value of the baud rate, options of the degree of multilevel that may realize the line rate of 200 (Gbps) are "3" and "4".

Reference symbol P2a indicates an example of a change in the OSNR tolerance (dB) for the degree of multilevel. The OSNR tolerance in a case of the degree of multilevel "3" is lower than the OSNR tolerance in a case of the degree of multilevel "4". Therefore, the degree of multilevel "3" is selected (see a dotted circle).

Reference symbol P3a indicates an example of a change in the transmission distance (km) for the degree of multilevel. The transmission distance in the case of the degree of multilevel "3" is, for example, about two thirds of the transmission distance in a case of the multilevel "2". As described above, when the degree of multilevel is a positive integer, the options of the degree of multilevel satisfying the conditions of the OSNR tolerance and the pass band narrowing are limited, and thus the transmission distance is insufficient.

On the other hand, for example, when a multilevel modulation scheme using probabilistic shaping (hereinafter, referred to as "PS") is used, it is possible to define the degree of multilevel with high accuracy up to digits after a decimal point.

Figure 4:
FIG. 4 is a diagram illustrating an example of a probabilistic shaping process.

FIG. 4 is a diagram illustrating an example of a PS process. In this example, a constellation of 16 QAM is taken as an example. In the constellation, symbols P11 to P14, P21 to P24, P31 to P34, and P41 to P44, which are signal points, are arranged evenly in first to fourth quadrants.

The size of circle indicating each of the symbols P11 to P14, P21 to P24, P31 to P34, and P41 to P44 indicates the value of the probability allocated to the symbol. The probability allocated to the symbol before the PS are equal among the symbols P11 to P14, P21 to P24, P31 to P34, and P41 to P44.

However, the probability allocated to the symbol after the PS becomes higher as the symbols P11 to P14, P21 to P24, P31 to P34, and P41 to P44 become closer to the center point O. For example, the probability allocated to the symbols P22, P23, P32, and P33 having the shortest distance from the center point O is maximum, and the probability allocated to the symbols P11, P14, P41, and P44 having the longest distance from the center point O is minimum.

As described above, according to the multilevel modulation using the PS, the probability distribution allocated to the symbols is formed such that the symbols closer to the center of the constellation are allocated more. Therefore, the degree of multilevel has digits after the decimal point due to the probability distribution biased to the symbols.

FIG. 5 is a diagram illustrating an example of selection of a degree of multilevel in an embodiment. In this example, the degree of multilevel may take continuous values by using the PS instead of the discrete value as in the comparative example. Lines in FIG. 5 illustrate characteristics of the line rate of 200 (Gbps) as examples.

Reference symbol P1b indicates an example of a change in the degree of multilevel for the baud rate. Within the range of 60 (Gbaud), which is the upper limit value of the baud rate, or less, options of the degree of multilevel that may realize the line rate of 200 (Gbps) are in the range of "2.1" or more.

Reference symbol P2b indicates an example of a change in the OSNR tolerance (dB) for the degree of multilevel. Within the range of the degree of multilevel "2.1" or more, the degree of multilevel at which the OSNR tolerance is minimized is "2.1". Therefore, the degree of multilevel "2.1" is selected (see black circle).

Reference symbol P3b indicates an example of a change in the transmission distance (km) for the degree of multilevel. The transmission distance in a case of the degree of multilevel "2.1" is about 1.5 times the transmission distance in the case of the degree of multilevel "3", which is selected when the degree of multilevel does not have digits after the decimal point. As described above, when the degree of multilevel has digits after the decimal point, the options of the degree of multilevel satisfying the conditions of the OSNR tolerance and the pass band narrowing are widened, and thus a sufficient transmission distance may be realized.

Next, configurations of the ROADM 5, the transmitting side TP 2a, and the receiving side TP 2b will be described.

(Configuration of ROADM)

Figure 6:
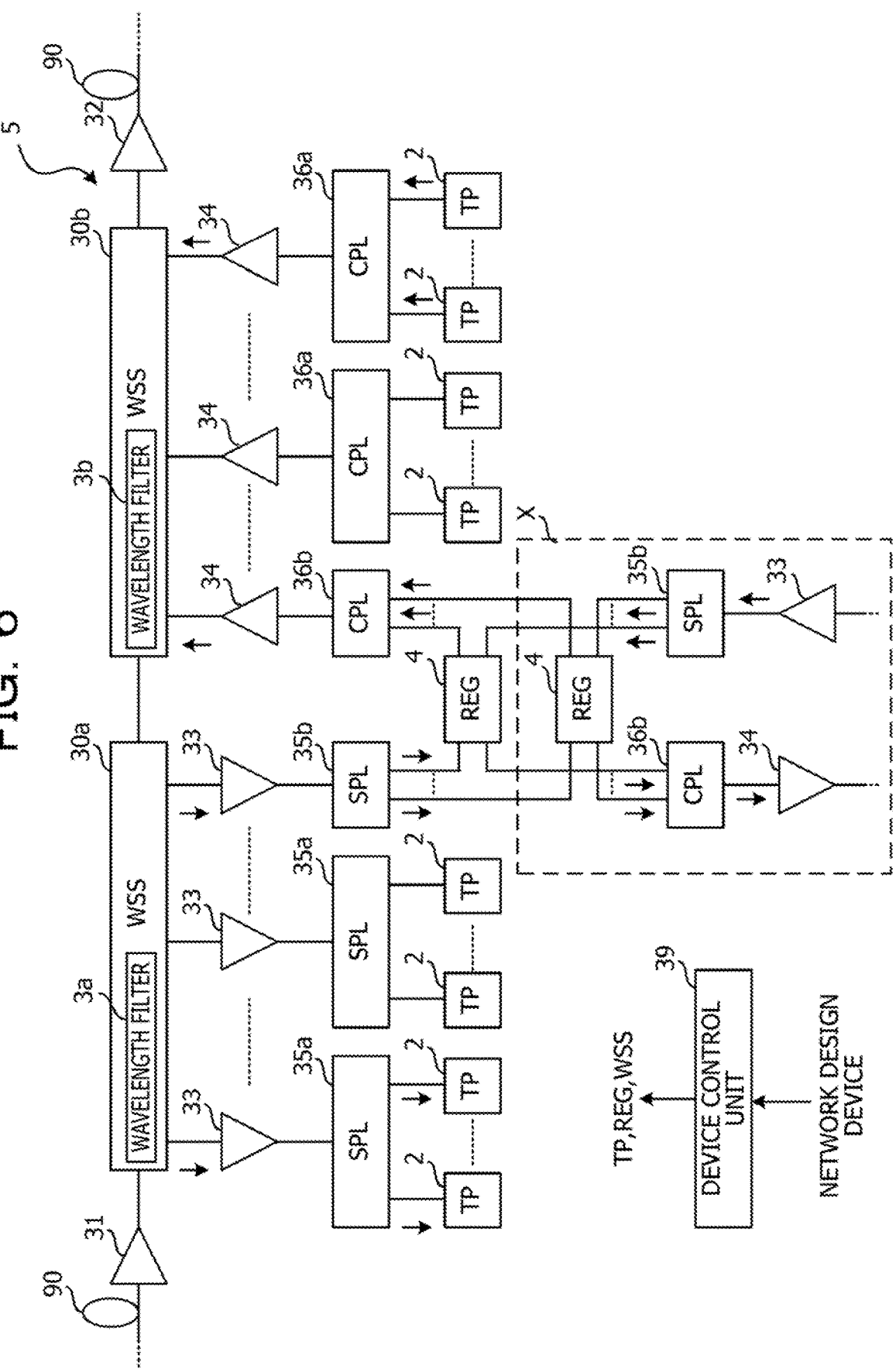
FIG. 6 is a configuration diagram illustrating an example of a reconfigurable optical add and drop multiplexer (ROADM)

FIG. 6 is a configuration diagram illustrating an example of the ROADM 5. The ROADM 5 includes WSSs 30a and 30b, a preamplifier 31, a post-amplifier 32, a plurality of optical amplifiers 33 and 34, a plurality of optical splitters (SPLs) 35a and 35b, a plurality of optical couplers (CPLs) 36a and 36b, a device control unit 39, and one or more regenerators (REG) 4. In FIG. 6, a configuration corresponding to one set of an input side route and an output side route is illustrated, but a configuration within a frame indicated by reference symbol X corresponds to another set of routes.

The preamplifier 31 is coupled to an input port of the input side WSS 30a, and the plurality of optical amplifiers 33 and the output side WSS 30b are coupled to a plurality of output ports of the input side WSS 30a. The input side WSS 30a and the plurality of optical amplifiers 34 are coupled to a plurality of input ports of the output side WSS 30b, and the post-amplifier 32 is coupled to an output port of the output side WSS 30b. The preamplifier 31 is coupled to a transmission path 90 on an input side, and the post-amplifier 32 is coupled to the transmission path 90 on an output side.

Output ports of the optical amplifiers 33 are coupled to input ports of the SPLs 35a and 35b, respectively. Output ports of the SPL 35a are coupled to TPs 2. The TP 2 is a TP including both a transmitting side TP 2a and a receiving side TP 2b. The TP 2 coupled to the SPL 35a corresponds to the transmitting side TP 2a.

Output ports of the CPLs 36a and 36b are coupled to input ports of the optical amplifiers 34, respectively. Input ports of the CPL 36a are coupled to the TPs 2. The TP 2 coupled to the CPL 36a corresponds to the receiving side TP 2b.

Output ports of the SPL 35b and input ports of the CPL 36b are coupled to input ports of the respective REGs 4 corresponding to the set of the routes and the set of the other routes. The REG 4 converts an optical signal Inputted to the input port into an electrical signal, converts the electrical signal into an optical signal again, and outputs the optical signal from an output port. Some of the input ports and output ports of the REG 4 of the set of routes and the REG 4 of the other set of routes (REG 4 within the dotted line frame of reference symbol X) are coupled to each other. Therefore, the optical signal is outputted from the route of the input source to the route corresponding to the destination.

The device control unit 39 includes, for example, a central processing unit (CPU) circuit and the like, and controls an operation of the ROADM 5. The device control unit 39 performs various settings on each TP 2, each REG 4, and the WSSs 30a and 30b under the control of the network management device 1. For example, the device control unit 39 sets the wavelength of the optical signal to be dropped to each of the TPs 2 coupled to the input side WSS 30a and the SPL 35a and the REG 4, and sets the wavelength of the optical signal to be added to each of the TPs 2 coupled to the output side WSS 30b and the CPL 36a and the REG 4.

The wavelength multiplexed optical signal inputted to the ROADM 5 is amplified by the preamplifier 31 and inputted to the input side WSS 30a. The input side WSS 30a separates the wavelength multiplexed optical signal into optical signals in units of wavelength by the wavelength filter 3a, outputs optical signals to be dropped to the optical amplifiers 33, and multiplexes other optical signals and outputs the multiplexed optical signal to the output side WSS 30b.

The output side WSS 30b separates the multiplexed light inputted from the input side WSS 30a into optical signals in units of wavelength by the wavelength filter 3b, and separates the multiplexed light to be added, which is inputted from the optical amplifier 34, into optical signals in units of wavelength by the wavelength filter. The output side WSS 30b generates a wavelength multiplexed optical signal by multiplexing the respective optical signals, and outputs the wavelength multiplexed optical signal to the post-amplifier 32. The post-amplifier 32 amplifies the wavelength multiplexed optical signal and outputs the signal to the transmission path 90. The wavelength filters 3a and 3b are, for example, mirror arrays that reflect light in units of wavelength toward arbitrary ports.

The optical amplifiers 33 amplify the optical signals and output the optical signals to the SPLs 35a and 35b, respectively. The SPL 35a drops and outputs the optical signal to the plurality of TPs 2. The TP 2 receives the optical signal having a set wavelength.

The CPL 36a multiplexes the optical signals inputted from the plurality of TPs 2 and outputs the multiplexed signal to the optical amplifier 34. The optical amplifier 34 amplifies the multiplexed optical signal and outputs the amplified multiplexed optical signal to the output side WSS 30b.

The SPL 35b drops and outputs the optical signals to the REG 4 of the set of routes and the REG 4 of the other set of routes. Each REG 4 outputs an optical signal to the CPL 36b of the set of routes corresponding to the destination following the setting from the device control unit 39. The optical signals inputted to the CPL 36b are multiplexed and outputted to the optical amplifier 34. The REG 4 terminates the optical signal, converts the optical signal into an electrical signal, converts the electrical signal into an optical signal again, and outputs the optical signal. Therefore, REG 4 corresponds to a boundary of the optical terminal section.

According to the above configuration, the optical signal passes through the input side WSS 30a and the output side WSS 30b when passing through the ROADM 5, passes through the input side WSS 30a when being dropped at the ROADM 5, and passes through the output side WSS 30b when being added at the ROADM 5. Therefore, the optical signal passes through the two wavelength filters 3a and 3b when the optical signal is to be passed, and passes through the one wavelength filter 3a or 3b when the optical signal is to be dropped or added. The band of the optical signal is narrowed by according to the number of passed wavelength filters.

(Configuration of TP 2)

Figure 7:
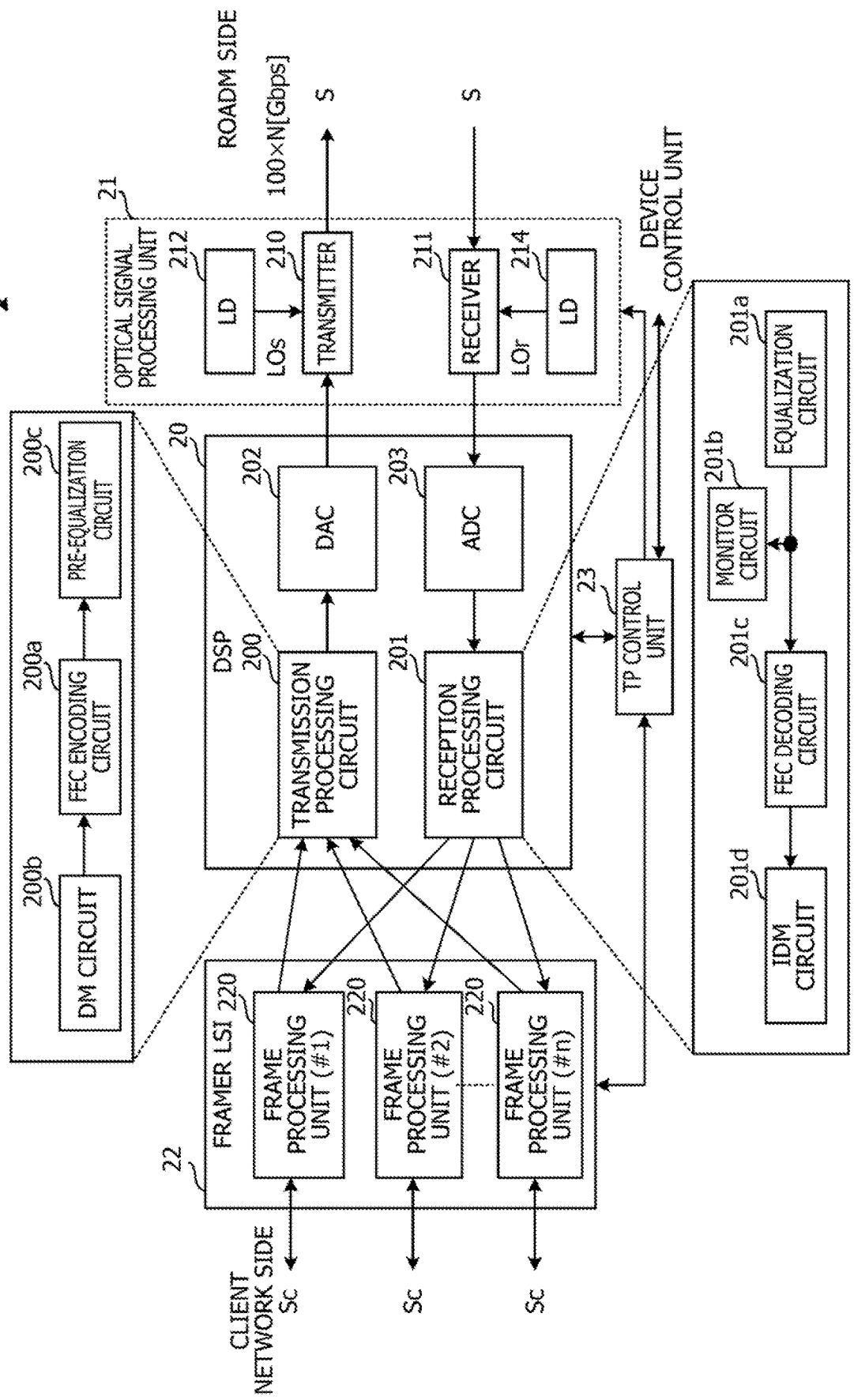
FIG. 7 is a configuration diagram illustrating an example of a transponder.

FIG. 7 is a configuration diagram illustrating an example of the TP 2. The TP 2 includes a DSP 20, an optical signal processing unit 21, a framer large scale integration (LSI) 22, and a TP control unit 23. The TP 2 is an example of a transmission device.

The optical signal processing unit 21 includes a transmitter 210, a receiver 211, and laser diodes (LDs) 212 and 214. The DSP 20 includes a transmission processing circuit 200, a reception processing circuit 201, a digital-to-analog converter (DAC) 202, and an analog-to-digital converter (ADC) 203.

The transmission processing circuit 200 includes a forward error correction (FEC) encoding circuit 200a, a pre-equalization circuit 200c, and a DM circuit 200b. The reception processing circuit 201 includes an equalization circuit 201a, an FEC decoding circuit 201c, an IDM circuit 201d, and a monitor circuit 201b. The framer LSI 22 includes frame processing units (#1 to #n) (n: positive integer) 220.

Each the frame processing unit 220 transmits and receives a client signal Sc to and from a client network. The client signal Sc is, for example, an Ethernet (registered trademark) signal. The frame processing unit 220 receives the client signal Sc from the client network, converts the client signal Sc into an optical channel transport unit (OTU) frame, and outputs the OTU frame to the transmission processing circuit 200. The transmission processing circuit 200 receives the OTU frame from one or more frame processing units 220.

The frame processing unit 220 receives an OTU frame from the reception processing circuit 201, converts the OTU frame into a client signal Sc, and transmits the client signal Sc to the client network. The reception processing circuit 201 outputs the OTU frames to one or more frame processing units 220.

The OTN frame is defined by the International Telecommunication Union Telecommunication Standardization Sector (ITU-T) Recommendation G.709. The frame format on the WDM network 91 side is not limited to the OTU frame.

The DM circuit 200b executes a DM process on the bit data of the OTU frame following the degree of multilevel set by the TP control unit 23. The DM process is a process of biasing a mark rate of the bit data of the client signal Sc. The details of the DM circuit 200d will be described later.

The DM circuit 200b performs a modulation process following the basic modulation scheme set by the TP control unit 23, thereby mapping the bit data of the OTU frame to symbols. The basic modulation scheme is a multilevel modulation scheme which is a basis of the PS process, and is 16 QAM in the example in FIG. 4. The DM circuit 200b performs the modulation process at the baud rate set by the TP control unit 23.

Since the mark rate of the bit data is biased by the DM process, the DM circuit 200b allocates the symbols so that a distribution biased at the center of the constellation is formed. The DM circuit 200b outputs the data signal obtained by the modulation process to the FEC encoding circuit 200a.

The FEC encoding circuit 200a generates an FEC as an example of an error correction code of the OTU frame and adds the FEC into the OTU frame. The FEC encoding circuit 200a outputs the OTU frame to the pre-equalization circuit 200c.

The pre-equalization circuit 200c compensates in advance the data signal of the OTU frame for various losses occurring in the transmission path 90. For example, the pre-equalization circuit 200c performs wavelength dispersion compensation, frequency offset compensation, input/output characteristic compensation of the DAC 202, and input/output characteristic compensation of the LD 212. The pre-equalization circuit 200c outputs the data signal to the DAC 202. The DAC 202 converts the data signal from a digital signal to an analog signal and outputs the analog signal to the transmitter 210.

The transmitter 210 includes an optical modulator, a polarization beam splitter, a polarization beam combiner, and the like. The transmitter 210 separates the transmission light LOs inputted from the LD 212 into H polarization and V polarization, and optically modulates the H polarization and V polarization with a data signal. The transmitter 210 generates an optical signal S by multiplexing the modulated light of the H polarization and the modulated light of the V polarization and outputs the optical signal S to the ROADM 5. The line rate of the optical signal S is 100×N (Gbps) when the transmission rate of the client signal is 100 (Gbps) and N (N: positive integer) client signals are contained in the optical signal S.

The optical signal S to be dropped is inputted from the ROADM 5 to the receiver 211. The receiver 211 includes a polarization beam splitter, an optical-electrical converter, and the like. The receiver 211 separates the optical signal S into components of H polarization and V polarization, receives the optical signal S by the local light LOr inputted from the LD 214, converts the optical signal S into an electrical data signal, and outputs the electrical data signal to the ADC 203. The ADC 203 converts the data signal from an analog signal to a digital signal and outputs the digital signal to the reception processing circuit 201.

The equalization circuit 201a statically and dynamically compensates the data signal for a loss generated in the transmission path 90. For example, the equalization circuit 201a performs wavelength dispersion compensation, frequency offset compensation, polarization mode dispersion compensation, and carrier phase recovery. The equalization circuit 201a outputs the data signal to the FEC decoding circuit 201c and the monitor circuit 201b.

The monitor circuit 201b monitors the quality of the data signal. For example, the monitor circuit 201b calculates generalized mutual information (GMI) and normalized generalized mutual information (NGMI) by analyzing the data signal. The GMI and NGMI are examples of index values related to the receiving side quality of the optical signal. For example, the GMI is an index value having a maximum value of the degree of multilevel of the optical signal, and the NGMI is an index value obtained by normalizing the degree of multilevel of the optical signal so that the maximum value is one.

The FEC decoding circuit 201c extracts the FEC from the data signal and performs data error correction. The FEC decoding circuit 201c outputs the data signal to the IDM circuit 201d.

The IDM circuit 201d detects a symbol by demapping the data signal and converts the symbol into bit data. The IDM circuit 201d performs an IDM process opposite to the DM process so as to restore the bit string of the OTU frame having a biased mark rate due to the DM process to the original bit string having a uniform mark rate. As a result, the data signal is demodulated into the OTU frame. The IDM circuit 201d outputs the OTU frame to the frame processing unit 220.

The TP control unit 23 is configured by, for example, a CPU circuit, and controls the DSP 20, the framer LSI 22, and the optical signal processing unit 21. The TP control unit 23 performs various settings on the DSP 20, the framer LSI 22, and the optical signal processing unit 21 following the control of the network management device 1. For example, the TP control unit 23 sets the basic modulation scheme, the degree of multilevel, and the baud rate in the DM circuit 200d and the IDM circuit 201d, and sets the FEC redundancy rate in the FEC encoding circuit 200a and the FEC decoding circuit 201c. The TP control unit 23 sets the line rate in the frame processing unit 220. As a result, the TP 2 determines the modulation scheme based on the degree of multilevel, the variable baud rate, and the basic modulation scheme, and transmits the optical signal.

As described above, the parameters affecting the pass band narrowing and the OSNR are set in the TP 2. The effects of the baud rate and the multilevel modulation scheme are as described above. The FEC redundancy rate indicates a ratio (%) of the FEC area added into the OTU frame, and as the value is larger, the error correction capability is higher, and thus the OSNR tolerance is improved. However, as the FEC redundancy rate increases, the baud rate is demanded to increase, and the effect of pass band narrowing increases. In this example, the FEC is used as an error correction method, but other error correction methods may be used.

(Configuration of REG)

Figure 8:
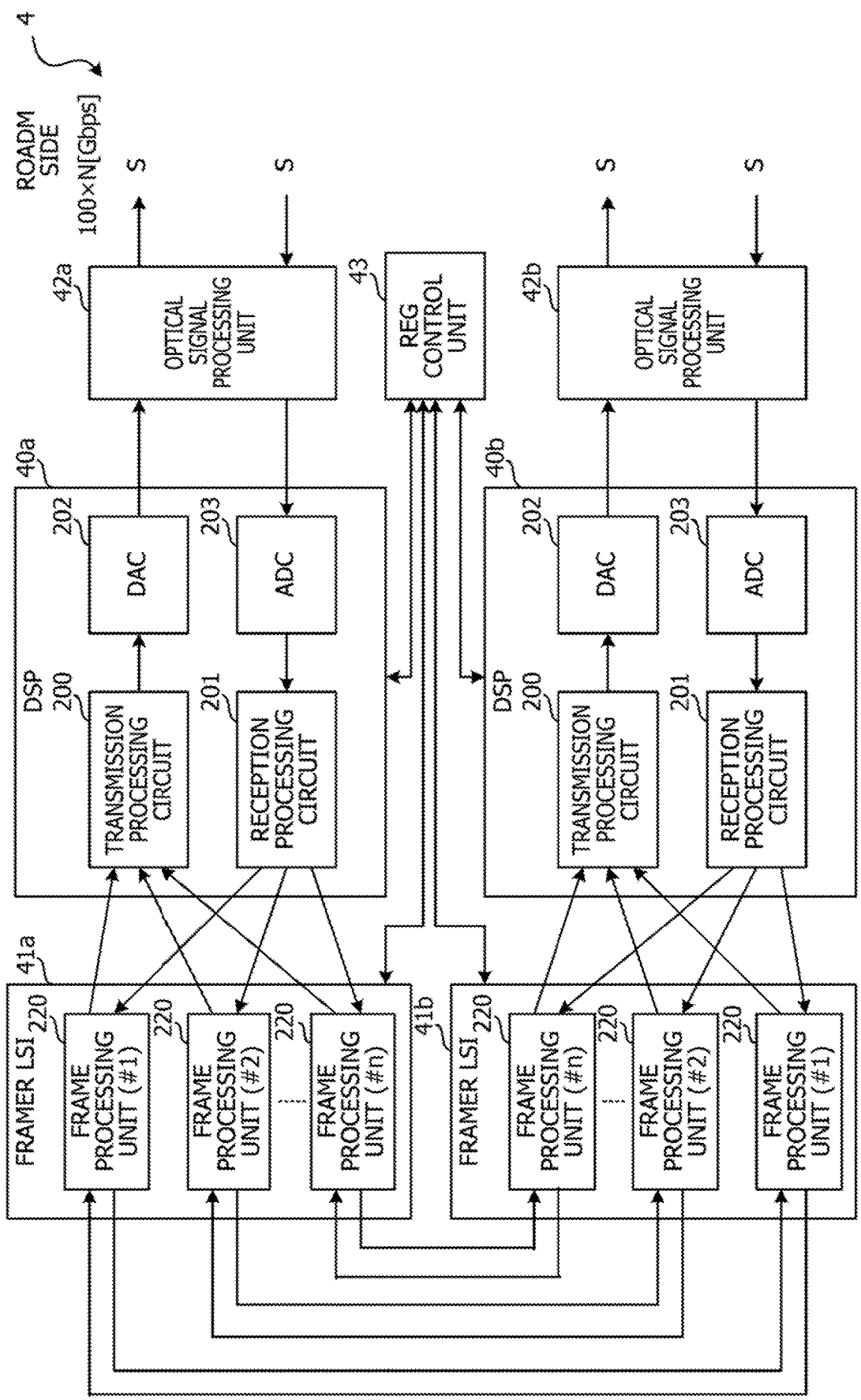
FIG. 8 is a configuration diagram illustrating an example of a regenerator.

FIG. 8 is a configuration diagram illustrating an example of the REG 4. In FIG. 8, constituents common to those in FIG. 7 are denoted by the same reference numerals, and a description thereof is omitted.

The REG 4 includes DSPs 40a and 40b, framer LSIs 41a and 41b, optical signal processing units 42a and 42b, and a REG control unit 43. The REG 4 has a configuration in which two TPs 2 are coupled to each other at interfaces on the client network side.

Each of the framer LSIs 41a and 41b includes a plurality of frame processing units 220 that are processing units (#1) 220 to processing units (#n) 220 (n is positive integer). The frame processing unit 220 of the framer LSI 41a and the frame processing unit 220 of the framer LSI 41b transmit and receive client signals to and from each other. The DSPs 40a and 40b have a similar configuration as the DSP 20 of the TP 2, and the optical signal processing units 42a and 42b have a similar configuration as the optical signal processing unit 21 of the TP 2. The REG control unit 43 is configured by, for example, a CPU circuit, and sets the frame processing unit 220, the transmission processing circuit 200, and the reception processing circuit 201 in a similar manner as the TP control unit 23 following an instruction of the network management device 1.

With the above configuration, the REG 4 may convert an optical signal inputted from a certain route into an electrical signal in one of the optical signal processing units 42a and 42b, and then convert the electrical signal into an optical signal again in the other of the optical signal processing units 42b and 42a to output the optical signal to another route. Therefore, when the REG 4 exists on the transmission path 90, the optical signal is temporarily terminated by the REG 4.

(Configuration of 16 QAM DM Circuit 200b)

Figure 9:
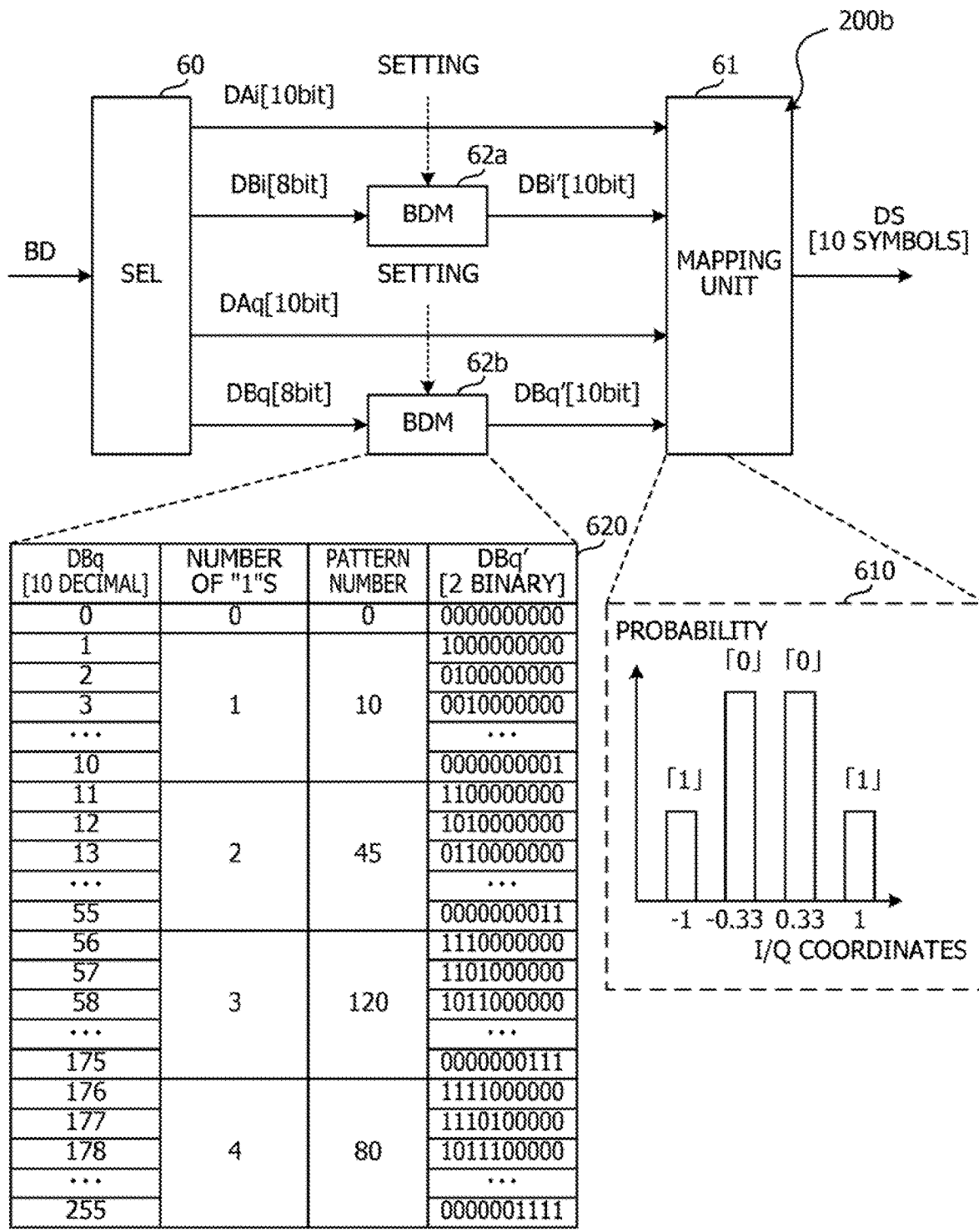
FIG. 9 is a diagram illustrating an example of a distribution matcher (DM) circuit when a basic modulation scheme is 16 QAM.

FIG. 9 is a diagram illustrating an example of the DM circuit 200b when the basic modulation scheme is 16 QAM. The DM circuit 200b includes a selector (SEL) 60, a mapping unit 61, and binomial distribution matchers (BDMs) 62a and 62b.

The bit data BD of the client signal Sc is inputted to the selector 60. The selector 60 divides the bit data BD into four bit strings DAi, DBi, DAq, and DBq. The bit string DAi is 10-bit parallel data, and the bit string DBi is 8-bit parallel data. The bit string DAq is 10-bit parallel data, and the bit string DBq is 8-bit parallel data. The bit strings DAi, DBi, DAq, and DBq are outputted to individual lanes.

The bit strings DAi and DBi correspond to the I component of the optical signal, and the bit strings DAq and DBq correspond to the Q component of the optical signal. The selector 60 may divide consecutive bits of the bit data BD into four bit strings DAi, DBi, DAq, and DBq, or may sequentially divide the consecutive bits into the bit strings DAi, DBi, DAq, and DBq bit by bit.

The BDM 62a converts the 8-bit bit string DBi into a 10-bit bit string DBi' based on a conversion table, and the BDM 62b converts the 8-bit bit string DBq into a 10-bit bit string DBq' based on the conversion table 620. The bit strings DBi' and DBq' are 10-bit parallel data.

As a result, the bit strings DBi and DBq are converted into the bit strings DBi' and DBq', respectively, in which the number of binary "1"s is reduced so that a mark rate is reduced. Although only the one conversion table 620 of BDM 62b is illustrated in FIG. 9, a conversion table of the other BDM 62a is also the same as the conversion table 620 of the BDM 62b except that the bit strings DBi and DBi' on the input side and the output side are different, and is therefore denoted by the same reference numeral.

In the BDMs 62a and 62b, for example, the basic modulation scheme and the degree of multilevel are set in advance from the network management device 1, and the conversion table 620 is generated according to the setting. In the conversion table 620, a value of the bit string DBq on the input side, a value of the bit string DBq' on the output side, the number of "1"s, and the number of patterns are registered.

Since the bit string DBq on the input side is 8-bit, the decimal of the bit string DBq is in a range of 0 to 255. The bit string DBq' on the output side is determined according to the number of binary "1"s in 10 bits and the number of patterns in which "1"s are arranged. When the number of "1"s is four, the number of patterns is 80, which is a part of the number of patterns in which four "1"s are arranged, based on the number of patterns of the bit string DBq on the input side.

The BDMs 62a and 62b reduce the number of "1"s by converting the bit strings DBi and DBq into the bit strings DBi' and DBq' using the conversion table 620. An average value of the number of "1"s in the bit strings DBi and DBq on the input side is 4 (=8×0.5) on the assumption that the randomness is high. On the other hand, an average value of the number of "1"s in the bit strings DBi' and DBq' on the output side is about 3.05 (=(0×1+1×10+2×45+3×120+4× 80)/256) from the conversion table 620. The bit strings DAi, DBi', DBq, and DBq' are inputted to the mapping unit 61.

The mapping unit 61 generates and outputs 10 symbols DS from the bit strings DAi, DB', DBq, and DBq'. The mapping unit 61 determines the quadrant of a symbol (see FIG. 4) according to the values of the bit strings DAi and DAq. Since the bit strings DAi and DAq are inputted to the mapping unit 61 without being converted, the randomness is high and the mark rate is maintained at about 0.5. Therefore, the quadrant of the symbol is determined with equal probability from the first to fourth quadrants.

The mapping unit 61 determines the I/Q coordinates of the symbols according to the values of the bit strings DBi' and DBq'. As indicated by reference numeral 610, the mapping unit 61 determines the I/Q coordinates of the symbol to be a coordinate (−0.33 or 0.33) close to the center of the IQ plane when the value of the bit string DBi' or DBq' is "0", and to be a coordinate (−1 or 1) far from the center of the IQ plane when the value of the bit string DBi' or DBq' is "1". A sign of the I/Q coordinates is determined according to the quadrant of the symbol.

Since the number of "1"s in each of the bit strings DBi' and DBq' is smaller than the number of "1"s in each of the bit strings DBi and DBq, the probability that the I/Q coordinates of the symbol are close to the center of the IQ plane is higher than the probability that the I/Q coordinates of the symbol are far from the center of the IQ plane. Therefore, as described with reference to FIG. 4, the distribution of the allocated symbols is biased to the center.

The mapping unit 61 generates, for example, 10 symbols from the Inputted bit strings DAi, DBi', DAq, and DBq' each having a length of 10 bits. At this time, since 10-bit DAi, 8-bit DBi, 10-bit DAq, and 8-bit DBq are outputted from the selector 60 and the total number of bits of the bit strings DAi, DBi', DAq, and DBq' is 36 bits, the information amount per symbol, for example, the degree of multilevel is 3.6 bit/symbol. In this manner, the PS process is performed.

(Configuration of 16 QAM IDM Circuit 201d)

Figure 10:
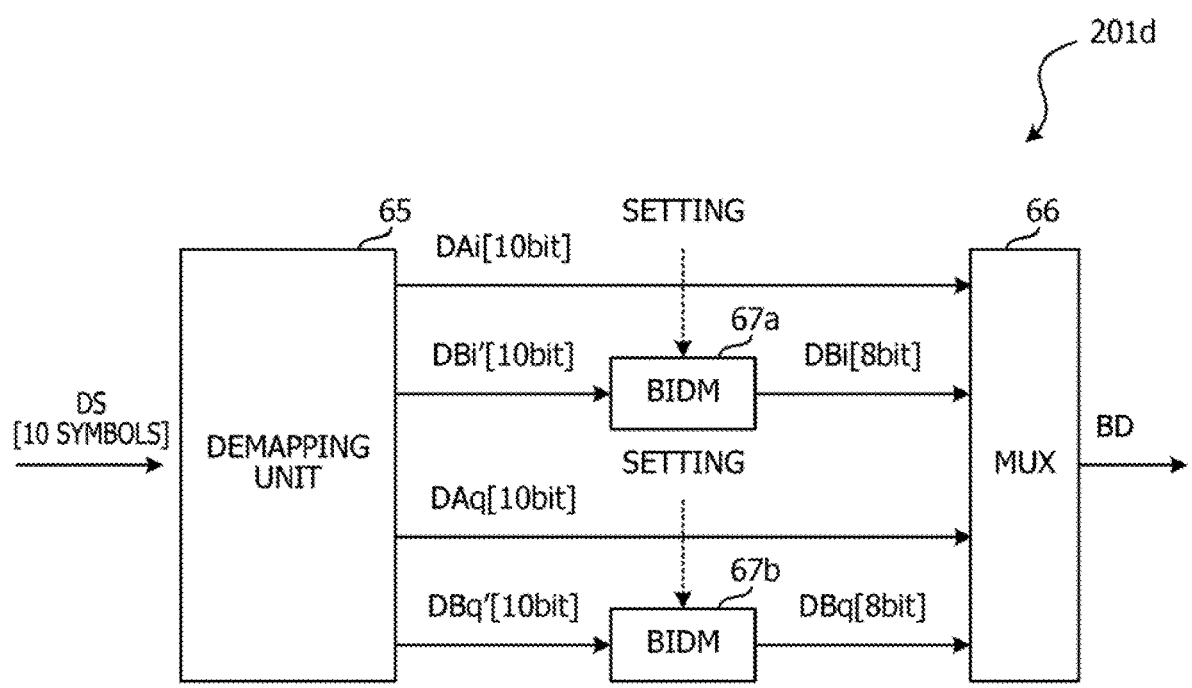
FIG. 10 is a diagram illustrating an example of an inverse-distribution matcher (IDM) circuit when the basic modulation scheme is 16 QAM.

FIG. 10 is a diagram illustrating an example of the IDM circuit 201d when the basic modulation scheme is 16 QAM. The IDM circuit 201d includes a demapping unit 65, a multiplexing unit (MUX) 66, and binomial inverse-distribution matchers (BIDMs) 67a and 67b. The IDM circuit 201d restores the original bit data BD by processing the bit strings DAi, DBi', DAq, and DBq' in a procedure reverse to that of the DM circuit 200b.

The demapping unit 65 generates bit strings DAi, DBi', DAq, and DBq' from the 10 symbols. The demapping unit 65 acquires respective values of the bit strings DAi, DBi', DAq, and DBq' from the I/Q coordinates of the symbols by performing a process opposite to that of the mapping unit 61. The bit strings DAi, DBi', DAq, and DBq' are outputted to individual lanes. The bit strings DBi' and DBq' are inputted to the BIDMs 67a and 67b.

The BIDMs 67a and 67b restore the bit strings DBi and DBq from the bit strings DBi' and DBq', respectively, by performing conversion opposite to that of the BDMs 62a and 62b. The bit strings DAi, DBi, DAq, and DBq are inputted to the multiplexing unit 66.

The multiplexing unit 66 restores the bit data BD from the bit strings DAi, DBi, DAq, and DBq. In this manner, the IDM circuit 201d performs the IDM process.

The DM circuit 200b and the IDM circuit 201d have configurations corresponding to the basic modulation scheme. A configuration when the basic modulation scheme is 64 QAM will be described below.

(Configurations of 64 QAM DM Circuit 200b and IDM Circuit 201d)

Figure 11:
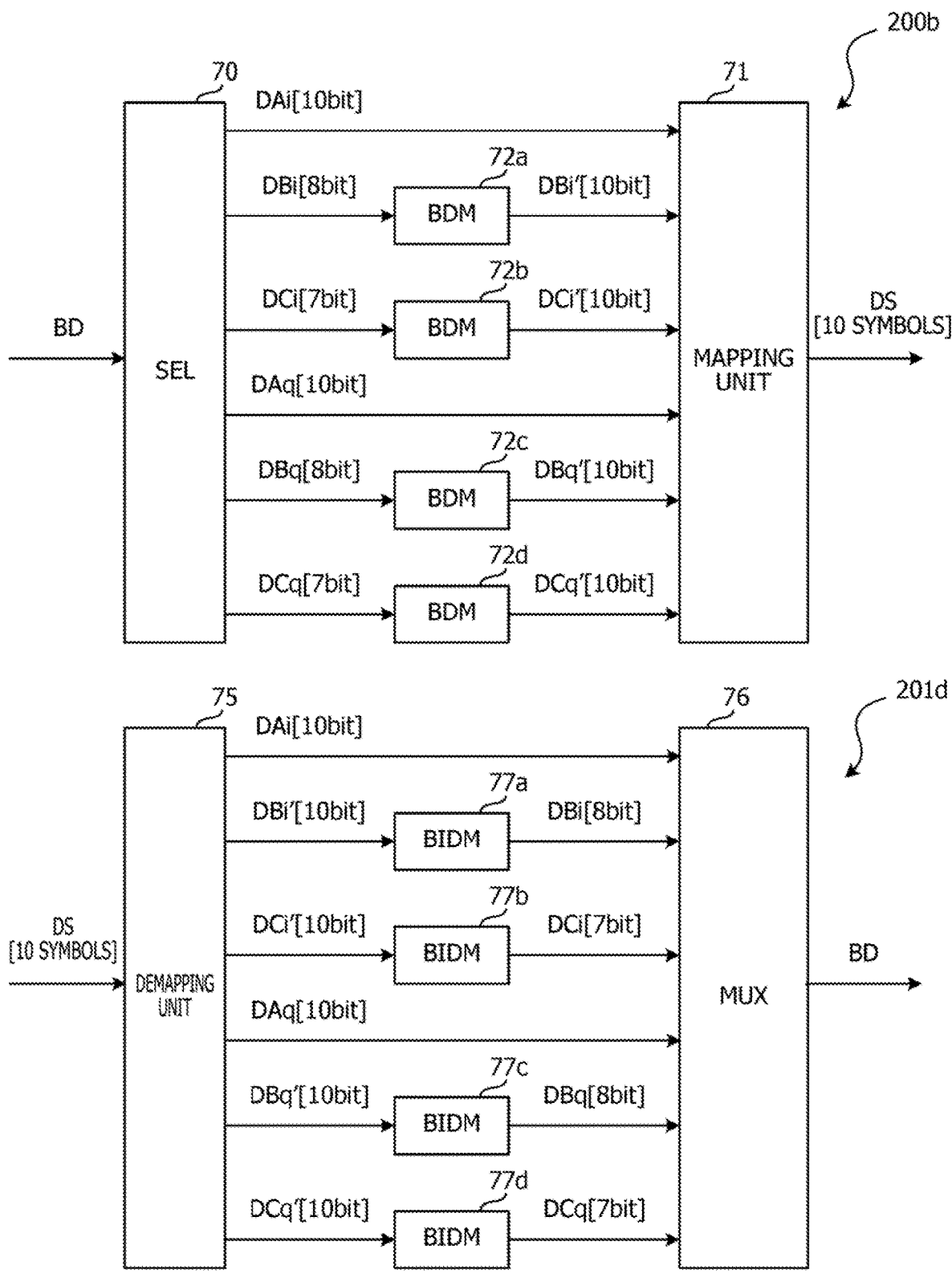
FIG. 11 is a diagram illustrating an example of a DM circuit and an IDM circuit when the basic modulation scheme is 64 QAM.

FIG. 11 is a diagram illustrating an example of the DM circuit 200b and the IDM circuit 201d when the basic modulation scheme is 64 QAM. The DM circuit 200b includes a selector (SEL) 70, a mapping unit 71, and BDMs 72a to 72d.

The bit data BD of the client signal Sc is inputted to the selector 70. The selector 70 divides the bit data BD into six bit strings DAi, DBi, DCi, DAq, DBq, and DCq. The bit strings DAi and DAq are 10-bit parallel data, the bit strings DBi and DBq are 8-bit parallel data, and the bit strings DCi and DCq are 7-bit parallel data. The bit strings DAi, DBi, DCi, DAq, DBq, and DCq are outputted to individual lanes.

The bit strings DA, DBi, and DCi correspond to the I component of the optical signal, and the bit strings DAq, DBq, and DCq correspond to the Q component of the optical signal. The selector 70 may divide consecutive bits of the bit data BD into six bit strings DAi, DBi, DCi, DAq, DBq, and DCq, or may sequentially divide the consecutive bits into the bit strings DAi, DBi, DCi, DAq, DBq, and DCq bit by bit.

The BDM 72a converts the 8-bit bit string DBi into the 10-bit bit string DBi' based on the conversion table, and the BDM 72b converts a 7-bit bit string DCi into a 10-bit bit string DC' based on the conversion table.

The bit strings DBi' and DCi' are 10-bit parallel data.

The BDM 72c converts the 8-bit bit string DBq into the 10-bit bit string DBq' based on the conversion table, and the BDM 72d converts a 7-bit bit string DCq into a 10-bit bit string DCq' based on the conversion table. The bit strings DBq' and DCq' are 10-bit parallel data.

The BDMs 72a to 72d respectively convert the bit strings DBi, DCi, DBq, and DCq so that the number of "1"s decreases, similar to the BDMs 62a and 62b in the case of 16 QAM. The bit strings DAi, DB, DCi', DAq, DBq', and DCq' are inputted to the mapping unit 71.

The mapping unit 71 generates and outputs 10 symbols DS from the bit strings DAi, DBi', DCi', DAq, DBq', and DCq'. The mapping unit 71 determines the quadrant of a symbol (see FIG. 4) according to the values of the bit strings DAi and DAq.

The mapping unit 71 determines the I/Q coordinates of the symbols according to the values of the bit strings DBi', DCi', DBq', and DCq'. When respective values of the bit strings DBi', DCi', DBq', and DCq' are "0", the mapping unit 71 determines the coordinates of the symbols to be coordinates close to the center in the IQ plane.

Since the number of "1"s in each of the bit strings DBi', DCi', DBq', and DCq' is smaller than the number of "1"s in each of the bit strings DBi, DCi, DBq, and DCq, the probability that the I/Q coordinates of the symbol are close to the center of the IQ plane is higher than the probability that the I/Q coordinates are far from the center of the IQ plane. Therefore, the distribution of the allocated symbols is biased to the center.

The mapping unit 71 generates, for example, 10 symbols from the bit strings DAi, DBi', DCi', DAq, DBq', and DCq'. Since the total number of bits of the bit strings DAi, DBi, DC, DAq, DBq, and DCq is 50 bits, the information amount per symbol, for example, the degree of multilevel is 5.0 bits/symbol. In this manner, the PS process is performed.

The IDM circuit 201d includes a demapping unit 75, a multiplexing unit (MUX) 76, and BIDMs 77a to 77d. The IDM circuit 201d restores the original bit data BD by processing the bit strings DAi, DBi', DCi', DAq, DBq', and DCq' in a procedure reverse to that of the DM circuit 200b.

The demapping unit 75 generates the bit strings DA, DBi', DCi', DAq, DBq', and DCq' from the 10 symbols. The demapping unit 75 acquires respective values of the bit strings DAi, DBi', DCi', DAq, DBq', and DCq' from the I/Q coordinates of the symbols by performing a process opposite to that of the mapping unit 71. The bit strings DAi, DBi', DCi', DAq, DBq', and DCq' are outputted to individual lanes. The bit strings DBi', DCi', DBq', and DCq' are input to the BIDMs 77a to 77d, respectively.

The BIDMs 77a to 77d restore the bit strings DBi, DCi, DBq, and DCq from the bit strings DBi', DCi', DBq', and DCq', respectively, by performing conversion opposite to that of the BDMs 72a to 72d. The bit strings DAi, DBi, DC, DAq, DBq, and DCq are inputted to the multiplexing unit 76.

The multiplexing unit 76 restores the bit data BD from the bit strings DAi, DBi, DC, DAq, DBq, and DCq. In this manner, the IDM circuit 201d performs the IDM process.

(Setting Process of DM Circuit 200b and IDM Circuit 201d)

The TP control unit 23 and the REG control unit 43 set the DM circuit 200b and the IDM circuit 201d in advance before operating the network system. The setting process of the DM circuit 200b and the IDM circuit 201d will be described below.

Figure 12:
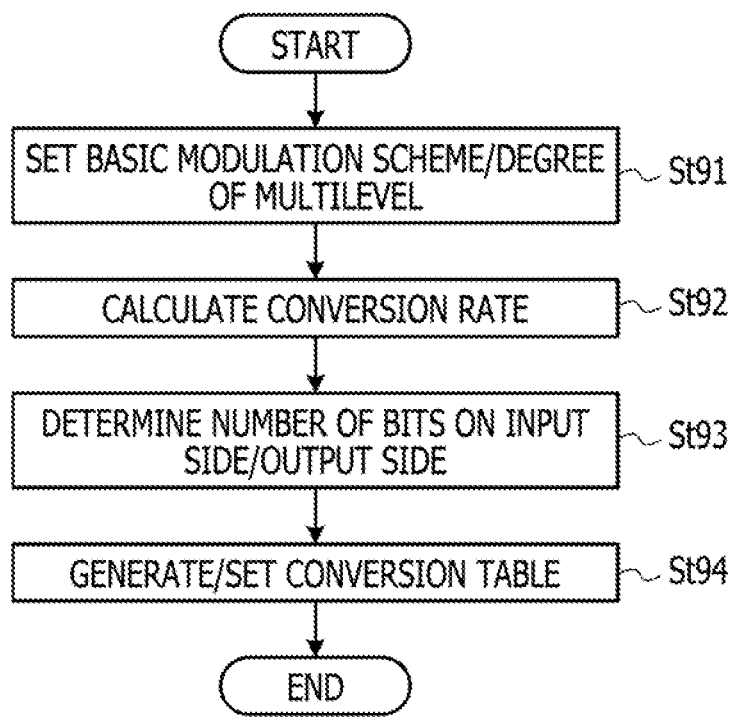
FIG. 12 is a flowchart illustrating an example of a setting process of the DM circuit and the IDM circuit.

FIG. 12 is a flowchart illustrating an example of a setting process of the DM circuit 200b and the IDM circuit 201d. This process is executed for all combinations of the basic modulation scheme and the degree of multilevel used in the network design described later. In this example, the operation of the TP control unit 23 will be described, but the operation of the REG control unit 43 is similar to this.

In the TP control unit 23, a combination of the basic modulation scheme and the degree of multilevel is set from the network management device 1 (step St91). Next, the TP control unit 23 calculates the conversion rate of the bit string from the basic modulation scheme and the degree of multilevel (step St92).

$$n = N \times (1+r)/M \quad (1)$$

The TP control unit 23 calculates the conversion rate r from, for example, the above Equation (1). n is a degree of multilevel (effective degree of multilevel after PS process), and N is a degree of multilevel of the basic modulation scheme. M is the number of drops in the unit of the i component or the q component of the selectors 60 and 70. For example, in the example in FIG. 9, N=4, n=3.6, and M=2.

The conversion rate r is a ratio of the number of bits of the bit string on the input side to the number of bits of the bit string on the output side. For example, in the example in FIG. 9, since the number of bits of the bit strings DBi and DBq on the input side is 8 bits and the number of bits of the bit strings DBi' and DBq' on the output side is 10 bits, the conversion rate is 0.8 (=8/10).

Next, the TP control unit 23 determines the number of bits of each bit string on the input side and the output side based on the conversion rate (step St93). The number of bits of the bit string on the output side is, for example, 8 bits and 10 bits, and the larger the absolute value thereof is, the finer the setting granularity of the degree of multilevel may be made. However, the circuit scale becomes large, so the number of bits is determined in consideration of both.

Next, the TP control unit 23 generates a conversion table (for example, the conversion table 620 in FIG. 9) from the number of bits of each bit string on the input side and the output side, and sets the conversion table in each of the BDMs 62a, 62b, 72a to 72d and the BIDMs 67a, 67b, 77a to 77d (step St94). In this manner, the setting process of each of the DM circuit 200b and the IDM circuit 201d is executed.

Each of the DM circuit 200b and the IDM circuit 201d holds the conversion table in a memory in association with the basic modulation scheme and the degree of multilevel. The TP control unit 23 sets the basic modulation scheme and the degree of multilevel instructed from the network management device 1 in the DM circuit 200b and the IDM circuit 201d. Thus, the DM circuit 200b and the IDM circuit 201d convert the bit string using the conversion table corresponding to the basic modulation scheme and the degree of multilevel.

(Configuration of Network Management Device 1)

The network management device 1 designs the WDM network 91 including the TP 2 and the ROADM 5. For example, the network management device 1 calculates the transmission route R of the optical signal, and performs appropriate setting of the TP 2 in consideration of the pass band narrowing and the OSNR so that a predetermined line rate condition is satisfied. At this time, when the network management device 1 determines that the optical signal may not be transmitted through the transmission route R, the transmission route R is divided into a plurality of optical terminal sections by arranging the REG 4 in the middle of the transmission route R. The network management device 1 will be described below.

Figure 13:
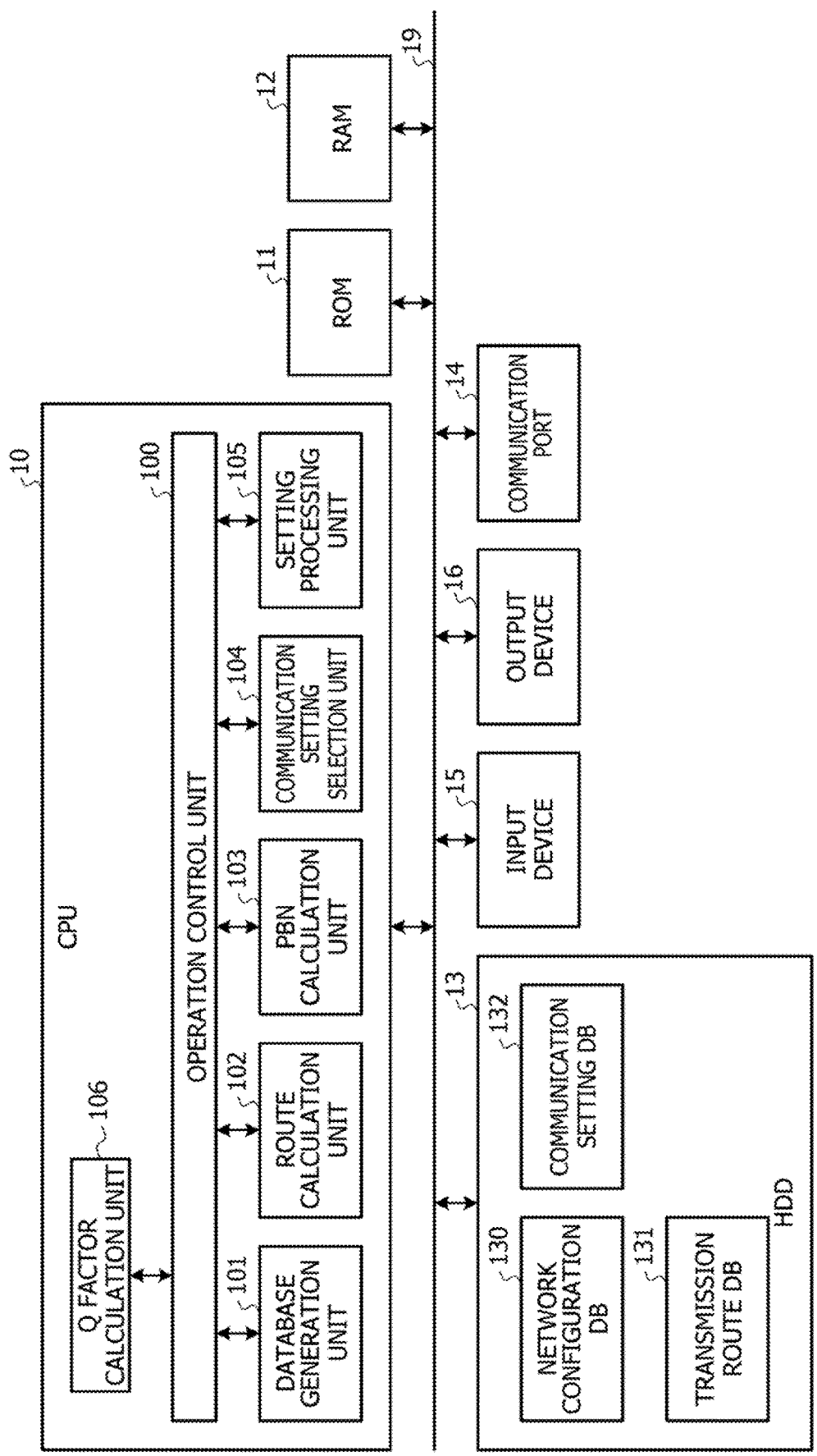
FIG. 13 is a configuration diagram illustrating an example of a network management device.

FIG. 13 is a configuration diagram illustrating an example of the network management device 1. The network management device 1 includes a CPU 10, a read-only memory (ROM) 11, a random-access memory (RAM) 12, a hard disk drive (HDD) 13, a communication port 14, an input device 15, and an output device 16. The CPU 10 is coupled to the ROM 11, the RAM 12, the HDD 13, the communication port 14, the input device 15, and the output device 16 via a bus 19 such that signals may be inputted and outputted to and from each other.

The ROM 11 stores a program for driving the CPU 10. The program includes a network design program that executes a network design method. The RAM 12 functions as a working memory for the CPU 10. The communication port 14 is, for example, a wireless LAN card or a network interface card (NIC), and processes communication between the CPU 10 and the TP 2, the REG 4, and the ROADM 5.

The input device 15 is a device used to input information into the CPU 10. The input device 15 may be, for example, a keyboard, a mouse, a touch panel, or the like. The input device 15 outputs the input information to the CPU 10 via the bus 19.

The output device 16 is a device used to output information from the CPU 10. The output device 16 may be, for example, a display, a touch panel, or the like. The output device 16 acquires and outputs information from the CPU 10 via the bus 19.

The CPU 10 reads a program from the ROM 11 to form, as functions, an operation control unit 100, a database generation unit 101, a route calculation unit 102, a pass band narrowing (PBN) calculation unit 103, a communication setting selection unit 104, a setting processing unit 105, and a Q factor calculation unit 106. The operation control unit 100, the database generation unit 101, the route calculation unit 102, the PBN calculation unit 103, the communication setting selection unit 104, the Q factor calculation unit 106, and the setting processing unit 105 may be configured by hardware such as a field-programmable gate array (FPGA) or an application-specified integrated circuit (ASIC).

The HDD 13 stores a network configuration database (DB) 130, a transmission route database (DB) 131, and a communication setting database (DB) 132. The storage unit of the network configuration DB 130, the transmission route DB 131, and the communication setting DB 132 are not limited to the HDD 13, and may be a memory.

In the network configuration DB 130, network configuration information indicating an arrangement and coupling relationship of the TP 2 and the ROADM 5 for each of the nodes A to D as illustrated in FIG. 1 is registered in advance from the input device 15, for example. Transmission route information indicating the transmission route R calculated by the CPU 10 is registered in the transmission route DB 131. The transmission route information includes, for example, identifiers of the TP 2 and the WSSs 30a and 30b for each of the nodes A to D through which the transmission route R passes. Therefore, the CPU 10 may acquire the number of the WSSs 30a and 30b for each optical signal transmission route from the transmission route DB131.

In the communication setting DB132, a plurality of operation modes defined by a combination of the basic modulation scheme, the degree of multilevel, the line rate, and the FEC redundancy rate are registered in association with parameters such as the baud rate corresponding to the operation modes. An example of the communication setting DB 132 will be described below.

FIG. 14 is a diagram illustrating an example of the communication setting DB 132. In the communication setting DB 132, the correspondence between the operation mode number (#1 to #26) indicating an operation mode, the mode parameters defining the operation mode, the baud rate, the band limit value (Bo), the penalty, and the OSNR tolerance is registered.

The operation mode number, the mode parameters, and the baud rate are registered in advance in the communication setting DB 132. The mode parameters include the basic modulation scheme, the line rate, the FEC redundancy rate, and the degree of multilevel. As an example, 16 QAM and 64 QAM corresponding to the modulation process executable by the DSPs 20, 40*a*, and 40*b* are registered in the basic modulation scheme.

As an example, when the transmission rate of the client signal is 100 (Gbps), for example, 200 (Gbps) (=100×2), 300 (Gbps) (=100×3), and 400 (Gbps) (=100×4) corresponding to the optical signals containing two, three, and four client signals, respectively, are registered in the line rate. As an example, 20(%) is registered for the FEC redundancy rate.

As the degree of multilevel, a value including digits after the decimal point is registered according to the multilevel modulation scheme using the PS. For example, in a case of the operation mode number #1, the degree of multilevel "2.0" in the basic modulation scheme "16 QAM" is registered, and in a case of the operation mode number #2, the degree of multilevel "2.2" in the basic modulation scheme "16 QAM" is registered.

FIG. 15 is a diagram illustrating a calculation example of a degree of multilevel. The number of bits and the conversion rate of each the bit string on the input side and the output side of the BDMs 62*a*, 62*b*, and 72*a* to 72*d* corresponding to each the degree of multilevel of the operation mode numbers #1 to #26 are illustrated. "BDM #1" refers to the BDMs 62*a* and 62*b* for 16 QAM and the BDMs 72*a* and 72*b* for 64 QAM, and "BDM #2" refers to the BDMs 72*c* and 72*d* for 64 QAM. The "calculation expression" indicates an expression for calculating the degree of multilevel from the number of bits of each the bit string on the input side and the output side.

Referring back to FIG. 14, a value calculated based on the line rate, the degree of multilevel, and the FEC redundancy rate is registered as the baud rate. The line rate is a transmission rate that may be realized from the values of the baud rate, the degree of multilevel, and the FEC redundancy rate. In the combination of the baud rate and the degree of multilevel, the lower the baud rate of the operation mode is, the larger the degree of multilevel is so that the requested line rate is satisfied.

As the band limit value (Bo), the penalty, and the OSNR tolerance, values calculated by the CPU 10 by simulation from the mode parameters and the baud rate are registered. The band limit value is an example of a lower limit value of the bandwidth of the optical signal for maintaining the predetermined quality of the optical signal when the mode parameters are set to TP 2. For example, the band limit value indicates a lower limit value of a bandwidth in which the receiving side TP 2 (receiving side TP 2*b*) may normally receive an optical signal without detecting a synchronization error.

The penalty is an example of the deterioration amount of the Q factor in the receiving side TP 2 (receiving side TP 2*b*). For example, the penalty indicates a penalty of the Q factor generated when the transmission band is the band limit value. The OSNR tolerance is as described above, and is a lower limit value of the OSNR for maintaining a predetermined quality of the optical signal (for example, for a bit error rate of 0 or less) when the mode parameters are set to TP 2.

In this manner, the HDD 13 stores information on the correspondence between the mode parameters and the baud rate, the band limit value, the penalty, and the OSNR tolerance.

Referring back to FIG. 13, the operation control unit 100 controls the operations of the database generation unit 101, the route calculation unit 102, the PBN calculation unit 103, the communication setting selection unit 104, and the setting processing unit 105 so that the network design process is executed in a predetermined sequence. The database generation unit 101, the route calculation unit 102, the PBN calculation unit 103, the communication setting selection unit 104, and the setting processing unit 105 receive various instructions and numerical values from the operation control unit 100, execute various processes according to the input, and output the results to the operation control unit 100.

Before network design, the database generation unit 101 calculates a band limit value, a penalty, and an OSNR tolerance corresponding to each operation mode in the communication setting DB 132, and registers them in the communication setting DB 132. The database generation unit 101 includes, for example, a simulator that calculates transmission performance based on various conditions, and calculates the band limit value, the penalty, and the OSNR tolerance as a simulation result. The band limit value, the penalty, and the OSNR tolerance are calculated from the mode parameters and the baud rate of the transmitting side TP 2 (transmitting side TP 2*a*) regardless of the transmission route R.

The route calculation unit 102 calculates one or more transmission routes R through which optical signals are transmitted based on the network configuration DB 130, and registers the transmission route information in the transmission route DB 131. For example, the route calculation unit 102 acquires information of the start node and the end node input from the input device 15, and calculates the shortest transmission route R coupling the start node and the end node by the Dijkstra method or the like. The Q factor calculation unit 106 calculates a receiving side Q factor by, for example, executing a simulation from the line rate, the basic modulation scheme, the baud rate, and the FEC redundancy rate of the operation mode.

The PBN calculation unit 103 is an example of a bandwidth calculation unit, and calculates a bandwidth B of the optical signal narrowed by the wavelength filter (hereinafter, referred to as "narrowed bandwidth") from the number of wavelength filters on the transmission route R of the optical signal. For example, the PBN calculation unit 103 counts the number of the WSSs 30*a* and 30*b* on the transmission route R based on the transmission route DB 131, and calculates the narrowed bandwidth B by integrating the narrowed amount of each of the WSSs 30*a* and 30*b* based on the counted number. For example, in the case of the transmission route R illustrated in FIG. 1, the narrowed bandwidth B corresponds to the bandwidth Wc of the optical signal outputted from the final-stage WSS 30*a*. The narrowed bandwidth is used by the communication setting selection unit 104 to select an operation mode.

The communication setting selection unit 104 selects an operation mode from the communication setting DB 132 following a line rate inputted from the input device 15 (hereinafter, referred to as a "requested line rate"). The communication setting selection unit 104 selects, for example, an operation mode in which a line rate of the mode parameters that is equal to or higher than the requested line rate. Thus, the communication setting selection unit 104 narrows down the operation modes satisfying the line rate request from the communication setting DB 132.

The communication setting selection unit 104 is an example of a selection unit, and selects an operation mode in which the band limit value Bo is equal to or less than the narrowed bandwidth B from respective operation modes in the communication setting DB 132. At this time, the combination of the basic modulation scheme, the degree of multilevel, and the baud rate of each operation mode in the communication setting DB 132 is an example of a plurality of combinations, and the combination of the basic modulation scheme, the degree of multilevel, and the baud rate of the selected operation mode is an example of a first combination.

Therefore, the communication setting selection unit 104 may select, from the communication setting DB 132, an operation mode that may withstand the pass band narrowing caused by the WSSs 30a and 30b on the transmission route R. As a result, the baud rate candidates set in the DSPs 20, 40a, and 40b are narrowed down to the baud rate equal to or lower than the predetermined value in consideration of the pass band narrowing.

The communication setting selection unit 104 further selects an operation mode based on the OSNR tolerance from the respective selected operation modes based on the narrowed bandwidth B. At this time, the combination of the basic modulation scheme, the degree of multilevel, and the baud rate of the selected operation mode is an example of a second combination.

Therefore, the communication setting selection unit 104 may select an operation mode with good OSNR tolerance from the communication setting DB 132. As a result, the candidates of the degrees of multilevel set in the DSPs 20, 40a, and 40b are narrowed down to the degrees of multilevel equal to or less than the predetermined value in consideration of the OSNR.

Therefore, the communication setting selection unit 104 may select a suitable operation mode from the viewpoint of pass band narrowing and OSNR. Since the degree of multilevel of the operation mode has digits after the decimal point, as described with reference to FIG. 5, the number of options of the degree of multilevel satisfying the conditions of the pass band narrowing and the OSNR is increased, and the transmission distance may be extended. Therefore, the network management device 1 may perform the appropriate network design in consideration of the pass band narrowing, the OSNR, and the transmission distance.

As an example, the communication setting selection unit 104 selects an operation mode having the smallest OSNR tolerance. Therefore, the communication setting selection unit 104 may select the operation mode with the best OSNR tolerance. The communication setting selection unit 104 is not limited to selecting the operation mode with the smallest OSNR tolerance, and may select an operation mode with an OSNR tolerance equal to or smaller than a predetermined value.

When there are a plurality of operation modes with the smallest OSNR tolerance, the communication setting selection unit 104 selects an operation mode with the smallest penalty among the operation modes. Therefore, the communication setting selection unit 104 may narrow down the operation modes based on the penalty.

The communication setting selection unit 104 outputs the operation mode narrowed down as described above to, for example, the output device 16. The output device 16 displays the operation mode on a screen, for example. Thus, the operator of the WDM network 91 may confirm the optimum operation mode.

The setting processing unit 105 sets the basic modulation scheme, the degree of multilevel, the line rate, the FEC redundancy rate, and the baud rate of the operation mode narrowed down as described above in each of the transmitting side and receiving side TPs 2. Therefore, the operator does not have to manually set each TP 2.

Next, the processing by the network management device 1 will be described. The processing by the network management device 1 is executed by the CPU 10 following the network design program.

Figure 16:
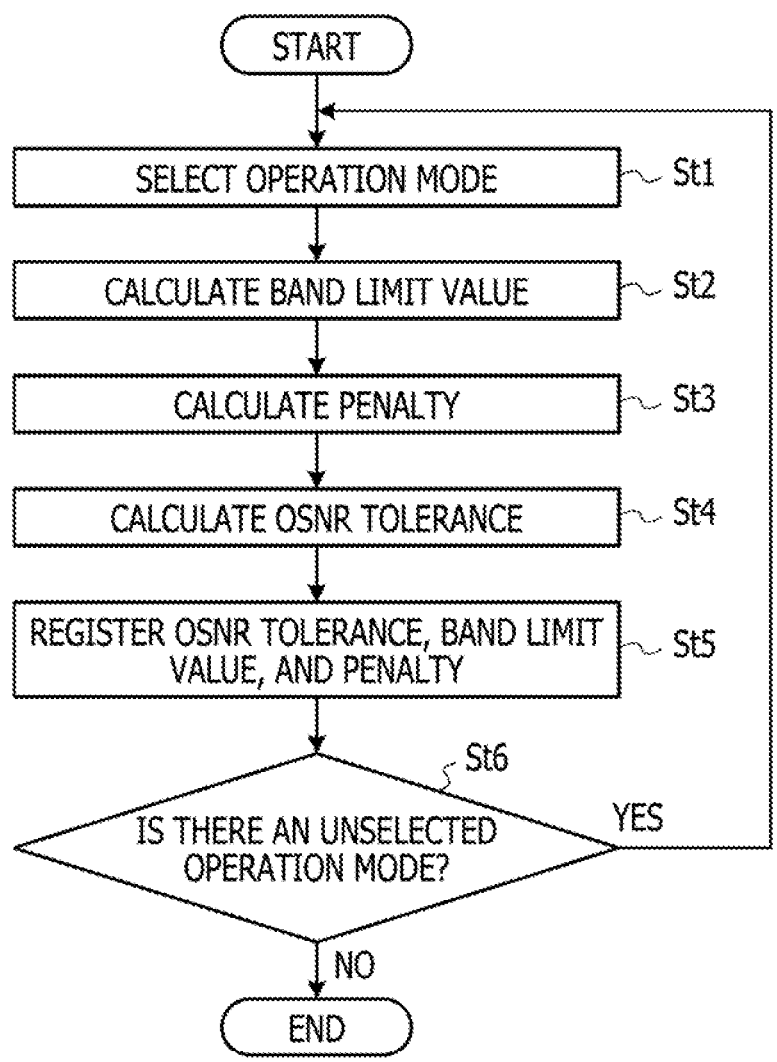
FIG. 16 is a flowchart illustrating an example of a generation process of the communication setting database.

FIG. 16 is a flowchart illustrating an example of a generation process of the communication setting DB 132. This process is executed before the network design.

The database generation unit 101 selects one operation mode from the communication setting DB132 (step St1). The order of selecting the operation modes is not limited.

Next, the database generation unit 101 calculates a band limit value from the mode parameters and the baud rate (step St2). Next, the database generation unit 101 calculates a penalty from the mode parameters and the baud rate (step St3). Next, the database generation unit 101 calculates an OSNR tolerance from the mode parameters and the baud rate (step St4).

Next, the database generation unit 101 registers the calculated OSNR tolerance, band limit value, and penalty in the communication setting DB 132 (step St5). Next, the database generation unit 101 determines whether there is an unselected operation mode among the respective operation modes in the communication setting DB 132 (step St6). When there is the unselected operation mode (Yes in step St6), each of the processes in step St1 and subsequent steps is executed again.

When there is no unselected operation mode (No in step St6), the process ends. In this manner, the generation process of the communication setting DB 132 is executed.

First Embodiment

Figure 17:
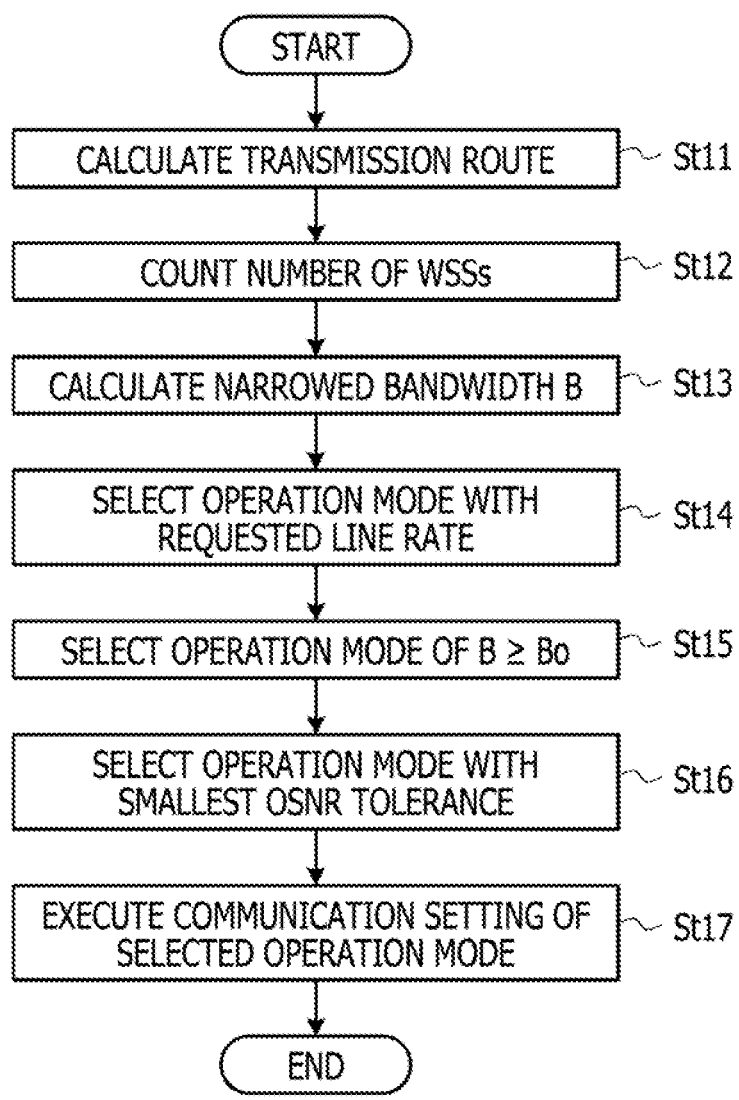
FIG. 17 is a flowchart illustrating an example of a communication setting process according to a first embodiment.

FIG. 17 is a flowchart illustrating an example of a communication setting process according to a first embodiment. This process is executed, for example, when the operation control unit 100 receives a network design instruction from the input device 15. In the network design instruction, for example, a start node and an end node of the transmission route R of an optical signal and a line rate are specified. In this example, the transmission route R illustrated in FIG. 1 will be described as an example.

The route calculation unit 102 calculates the transmission route R coupling the start node A and the end node D based on the network configuration DB 130 (step St11). As a method of calculating the transmission route R, the Dijkstra method is exemplified, but the method is not limited thereto.

Next, the PBN calculation unit 103 counts the number of WSSs on the transmission route R, for example, the number of wavelength filters (step St12). Since there are four WSSs 30a and 30b on the transmission route R, the number of WSSs is four. When an arrayed waveguide grating (AWG) is provided on the transmission route R instead of the WSSs 30a and 30b or in addition to the WSSs 30a and 30b, the PBN calculation unit 103 counts the number of wavelength filters of the AWG in the similar manner as the WSSs 30a and 30b.

Next, the PBN calculation unit 103 calculates the narrowed bandwidth B from the number of WSSs (step St13). At this time, the PBN calculation unit 103 calculates the narrowed bandwidth B by integrating the narrowed amounts of the WSSs 30a and 30b based on the number of WSSs. The narrowed bandwidth B is calculated as 35 (GHz) since the number of WSSs is four, for example.

Next, the communication setting selection unit 104 selects the operation mode with a requested line rate (step St14).

For example, when the requested line rate is 200 (Gbps), respective operation modes with the operation mode numbers #1 to #11 are selected.

Next, the communication setting selection unit 104 selects an operation mode in which the band limit value Bo is equal to or less than the narrowed bandwidth B from the respective operation modes with the operation mode numbers #1 to #11 (step St15). When the narrowed bandwidth B is 35 (GHz), the communication setting selection unit 104 selects respective operation modes with an operation mode number #9 with a band limit value Bo=34.5 (GHz), an operation mode number #10 with a band limit value Bo=32.7 (GHz), and an operation mode number #11 with a band limit value Bo=31.1 (GHz). The combination of the degree of multilevel and the baud rate of each operation mode of the operation mode numbers #9, #10, and #11 corresponds to the first combination.

Next, the communication setting selection unit 104 selects the operation mode having the smallest OSNR tolerance among the respective operation modes with the operation mode numbers #9, #10, and #11 (step St16). Since OSNR tolerance values of the respective operation modes with the operation mode numbers #9, #10, and #11 are 23 (dB), 24 (dB), and 25 (dB), the communication setting selection unit 104 selects the operation mode with the operation mode number #9. The combination of the degree of multilevel and the baud rate of the operation mode with the operation mode number #9 corresponds to the second combination.

Next, the setting processing unit 105 executes the communication setting of the selected operation mode (step St17). For example, the setting processing unit 105 sets the line rate (200 (Gbps)), the basic modulation scheme (16 QAM), the baud rate (35.6 (Gbaud)), the degree of multilevel (3.6), and the FEC redundancy rate (20(%)) of the operation mode with the operation mode number #9 in the transmitting side TP 2a and the receiving side TP 2b. In this way, the communication setting process is executed. In this example, since the FEC redundancy rate is included in the mode parameters, the communication setting selection unit 104 may select an appropriate FEC redundancy rate, but the FEC redundancy rate may not be included in the mode parameters.

As described above, the PBN calculation unit 103 calculates the bandwidth of the optical signal narrowed by the wavelength filters 3a and 3b from the number of the wavelength filters 3a and 3b on the transmission route R of the optical signal. Based on the communication setting DB 132, the communication setting selection unit 104 selects a combination of a degree of multilevel and a baud rate whose bandwidth limit value is equal to or less than the bandwidth of the narrowed optical signal. The communication setting selection unit 104 selects one combination from the combinations being selected based on the OSNR tolerance. The setting processing unit 105 sets the degree of multilevel and the baud rate of the combination in TP 2.

Therefore, the communication setting selection unit 104 may select an operation mode with good OSNR tolerance from the communication setting DB 132. As a result, the candidates of the degrees of multilevel set in the DSPs 20, 40a, and 40b are narrowed down to the degrees of multilevel equal to or less than the predetermined value in consideration of the OSNR.

Therefore, the communication setting selection unit 104 may select a suitable operation mode from the viewpoint of pass band narrowing and OSNR. Since the degree of multilevel of the operation mode has digits after the decimal point, as described with reference to FIG. 5, the number of options of the degree of multilevel satisfying the conditions of the pass band narrowing and the OSNR is increased, and the transmission distance may be extended. Since the basic modulation scheme is included in the operation mode, it is possible to select from two or more operation modes with the same degree of multilevel and different basic modulation schemes, and thus a wide selection of operation modes may be prepared. Therefore, the network management device 1 may perform the appropriate network design in consideration of the pass band narrowing, the OSNR and the transmission distance.

Second Embodiment

Figure 18A:
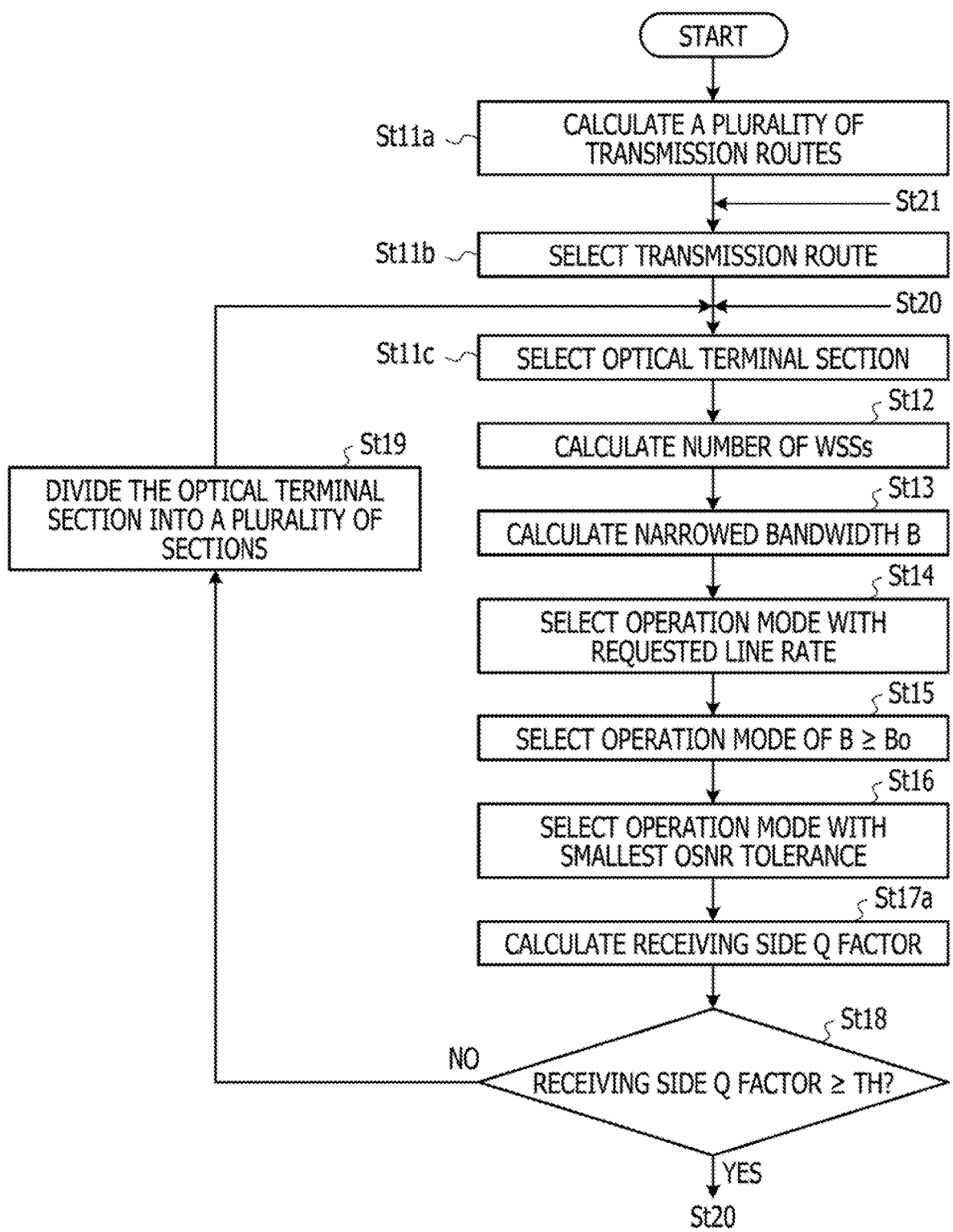
FIG. 18A is a flowchart illustrating a communication setting process according to a second embodiment.
Figure 18B:
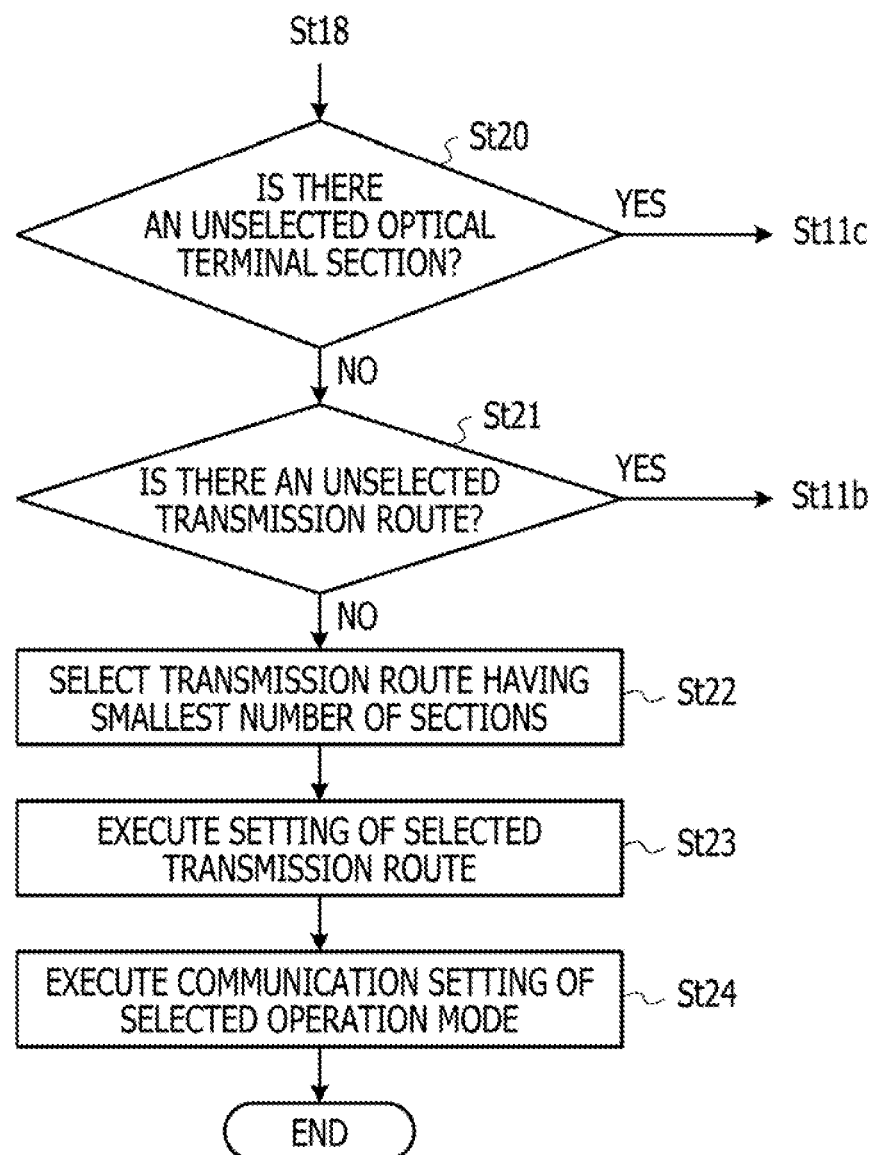
FIG. 18B is a flowchart illustrating a communication setting process according to a second embodiment.

FIG. 18A to 18B is a flowchart illustrating a communication setting process according to a second embodiment. In FIG. 18A, processes in common with FIG. 17 are denoted by the same reference symbols, and the explanation thereof is omitted.

The route calculation unit 102 calculates a plurality of transmission routes (step St11a). The calculated plurality of transmission routes is registered in the transmission route DB 131. Next, the communication setting selection unit 104 selects one transmission route from the respective transmission routes in the transmission route DB 131 (step St11b).

Next, the communication setting selection unit 104 selects one of optical terminal sections of the selected transmission route (step St11c). Next, the communication setting selection unit 104 executes the processes of steps St12 to St16 described above for the selected optical terminal section.

Next, the Q factor calculation unit 106 calculates the receiving side Q factor when the optical signal is transmitted to the selected optical terminal section (step St17a). At this time, the Q factor calculation unit 106 calculates the receiving side Q factor by, for example, executing a simulation from the line rate, the basic modulation scheme, the baud rate, and the FEC redundancy rate of the operation mode selected in step St16.

Next, the communication setting selection unit 104 compares the receiving side Q factor with a predetermined threshold TH (step St18). When the receiving side Q factor is less than the threshold TH (No in step St18), the communication setting selection unit 104 determines that the optical signal may not be transmitted to the optical terminal section of the selected transmission route, and divides the selected optical terminal section into a plurality of optical terminal sections (step St19).

For example, the communication setting selection unit 104 assumes that the REG 4 is coupled to the ROADM 5 of a node in the middle of the selected optical terminal section, and generates a new optical terminal section with the REG 4 as a boundary. Thereafter, the processes of steps St11c to St18 are executed again for each of the new optical terminal sections obtained by the division. Accordingly, the communication setting selection unit 104 divides the transmission route in which the receiving side Q factor is less than the predetermined threshold TH into a plurality of optical terminal sections in which each receiving side Q factor is equal to or greater than the predetermined threshold TH.

When the receiving side Q factor is equal to or greater than the predetermined threshold TH (Yes in step St18), the communication setting selection unit 104 determines whether there is an unselected optical terminal section (step St20). When there is the unselected optical terminal section (Yes in step St20), another optical terminal section is selected (step St11c), and each of the processes in step St12 and subsequent steps is executed again for the other optical terminal section.

When there is no unselected optical terminal section (No in step St20), the communication setting selection unit 104 determines whether there is an unselected transmission route among the transmission routes of the transmission route DB 131 (step St21). When there is an unselected transmission route (Yes in step St21), another transmission route is selected (step St11b), and each of the processes in step St11c and subsequent steps is executed again for the selected other transmission route.

When there is no unselected transmission route (No in step St21), the communication setting selection unit 104 selects a transmission route having the smallest number of optical terminal sections, for example, a transmission route having the smallest number of REGs 4 among the transmission routes of the transmission route DB 131 (step St22). Therefore, the number of REGs 4 on the transmission route is minimized, and the equipment cost of the WDM network is reduced.

Next, the setting processing unit 105 executes setting for the WDM network of the selected transmission route (step St23). At this time, the setting processing unit 105 executes wavelength setting of the WSSs 30a and 30b for the ROADM 5 of each node on the transmission route according to the presence or absence of the REG 4, or the like.

Next, the setting processing unit 105 executes the communication setting of the operation mode selected in step St16 (step St24). In this way, the communication setting process is executed.

Next, an operation example of the communication setting process of this example will be described.

Figure 19:
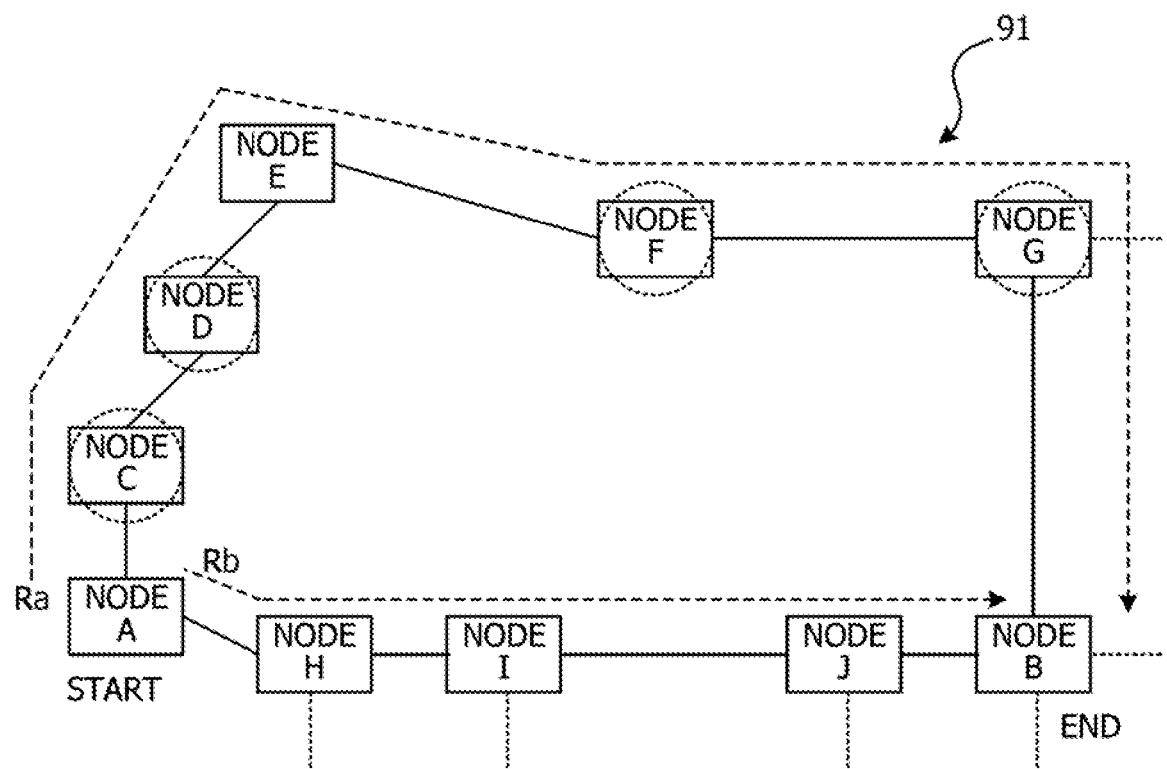
FIG. 19 is a configuration diagram illustrating another example of a wavelength division multiplex (WDM) network.

FIG. 19 is a configuration diagram illustrating another example of the WDM network 91. The WDM network 91 includes nodes A to J coupled in a ring shape. The form of the WDM network 91 is not limited to a ring shape, and may be a mesh shape.

Each of the nodes C, D, F, and G is provided with the ILA 6 (see dotted circle), and each of the other nodes A, B, E, H, I, and J is provided with the ROADM 5. It is assumed that the start node is the node A and the end node is the node B.

It is assumed that the route calculation unit 102 calculates two transmission routes Ra and Rb. The transmission route Ra passes through the nodes A, C to G, and B in this order, and the transmission route Rb passes through the nodes A, H, I, J, and B in this order.

Figure 20:
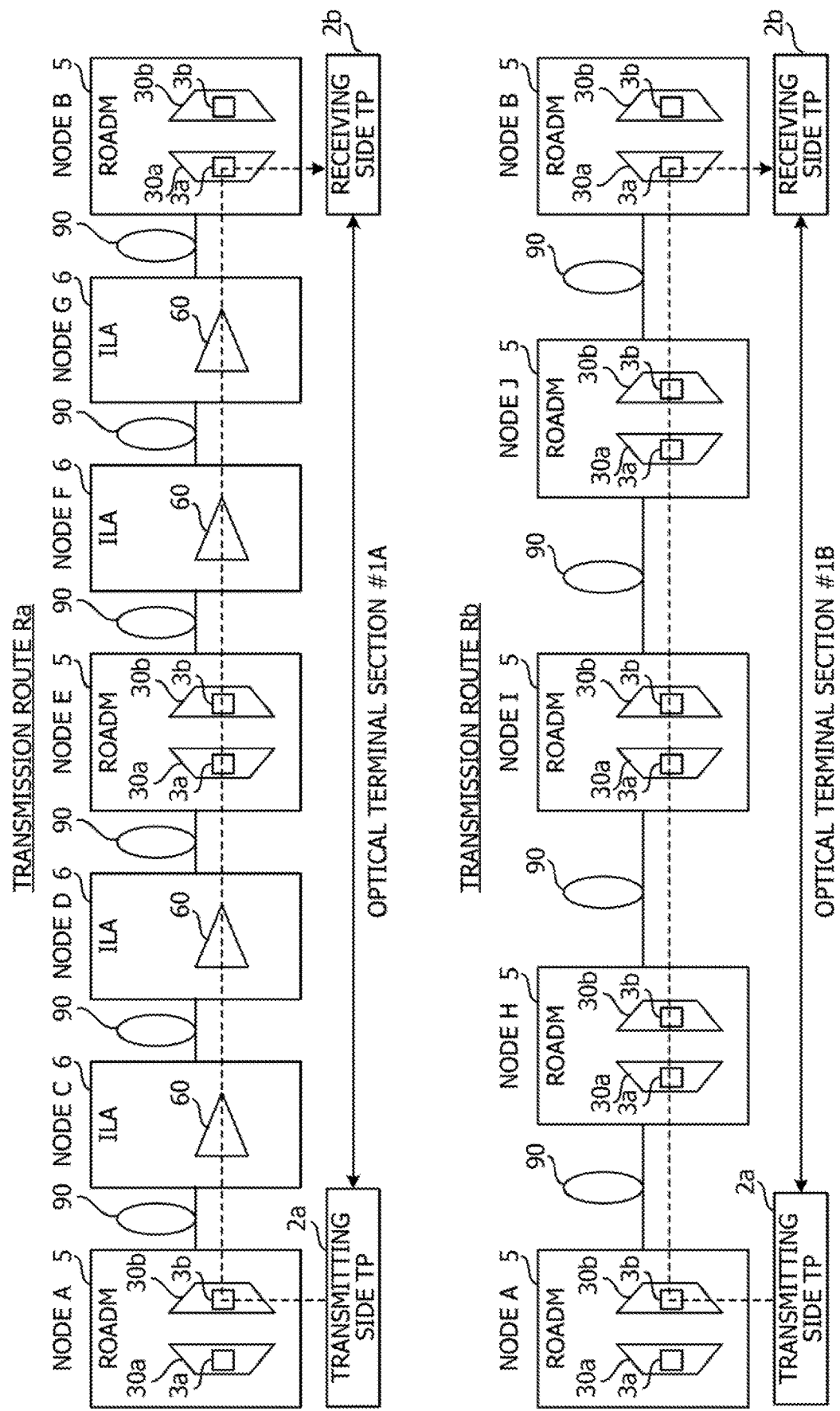
FIG. 20 is a diagram illustrating an example of a transmission route.

FIG. 20 is a diagram illustrating an example of the transmission routes Ra and Rb. In FIG. 20, constituents common to those in FIG. 1 are denoted by the same reference numerals, and the explanation thereof is omitted. The process of the network management device 1 will be described below with reference to FIGS. 20 and 13 using the flowchart illustrated in FIG. 18A to 18B.

The route calculation unit 102 calculates the transmission routes Ra and Rb (step St11a). The communication setting selection unit 104 selects the transmission route Ra (step St11b), and then selects an optical terminal section #1A of the transmission route Ra (step St11c). Since the REG 4 is not provided on the transmission route Ra, there is only the optical terminal section #1A from the transmitting side TP 2a of the start node A to the end node B, and there is no other optical terminal section.

Next, the PBN calculation unit 103 counts four, which is the number of WSSs 30a and 30b, as the number of wavelength filters 3a and 3b on the transmission route Ra (step St12). Next, the PBN calculation unit 103 calculates 60 (GHz) as the narrowed bandwidth B (step St13).

Next, the communication setting selection unit 104 selects the respective operation modes with the operation mode numbers #1 to #11 corresponding to the requested line rate of 200 (Gbps) among the operation modes in the communication setting DB 132 (step St14). Next, the communication setting selection unit 104 selects respective operation modes with the operation mode numbers #2 to #11 in which the band limit values Bo are equal to or less than 60 (GHz) of the narrowed bandwidth B (corresponding to the first combination) among the operation modes with the operation mode numbers #1 to #11 (step St15).

Next, the communication setting selection unit 104 selects the operation mode with the operation mode number #2 having the smallest OSNR tolerance (corresponding to the second combination) among the respective operation modes with the operation mode numbers #2 to #11 (step St16). Next, the communication setting selection unit 104 calculates the receiving side Q factor according to the mode parameters and the baud rate of the operation mode of the operation mode number #2 (step St17a). It is assumed that the receiving side Q factor is 10 (dB).

Next, the communication setting selection unit 104 compares the receiving side Q factor with the threshold TH (step St18). When the threshold TH is 7 (dB), since the receiving side Q factor ≥ the threshold TH is satisfied (Yes in step St18), the communication setting selection unit 104 determines that the optical signal may be transmitted to the optical terminal section #1A, and ends the process related to the optical terminal section #1A.

Next, since there is no other optical terminal section (No in step St20), the communication setting selection unit 104 selects the other transmission route Rb (Yes in step St21, St11b). Since the REG 4 is not provided on the transmission route Rb, there is only an optical terminal section #1B from the transmitting side TP 2a of the start node A to the end node B, and there is no other optical terminal section.

Next, the communication setting selection unit 104 counts eight, which is the number of WSSs 30a and 30b, as the number of wavelength filters 3a and 3b on the transmission route Rb (step St12). Next, the PBN calculation unit 103 calculates 47 (GHz) as the narrowed bandwidth B (step St13).

Next, the communication setting selection unit 104 selects the respective operation modes with the operation mode numbers #1 to #11 corresponding to the requested line rate of 200 (Gbps) among the operation modes in the communication setting DB 132 (step St14). Next, the communication setting selection unit 104 selects the operation modes with the operation mode numbers #5 to #11 in which the band limit values Bo are equal to or less than 47 (GHz) of the narrowed bandwidth B (corresponding to the first combination) among the respective operation modes with the operation mode numbers #1 to #11 (step St15).

Next, the communication setting selection unit 104 selects the operation mode with the operation mode number #5 having the smallest OSNR tolerance (corresponding to the second combination) from the operation modes with the operation mode numbers #5 to #11 being selected (step St16). Next, the communication setting selection unit 104 calculates the receiving side Q factor according to the mode parameters and the baud rate of the operation mode with the operation mode number #5 (step St17). It is assumed that the receiving side Q factor is 4 (dB).

Next, the communication setting selection unit 104 compares the receiving side Q factor with the threshold TH (step St18). When the threshold TH is 7 (dB), since the receiving side Q factor≥threshold TH is not satisfied (No in step St18), the communication setting selection unit 104 divides the selected optical terminal section #1B into a plurality of optical terminal sections by the REG 4 (step St19).

Figure 21:
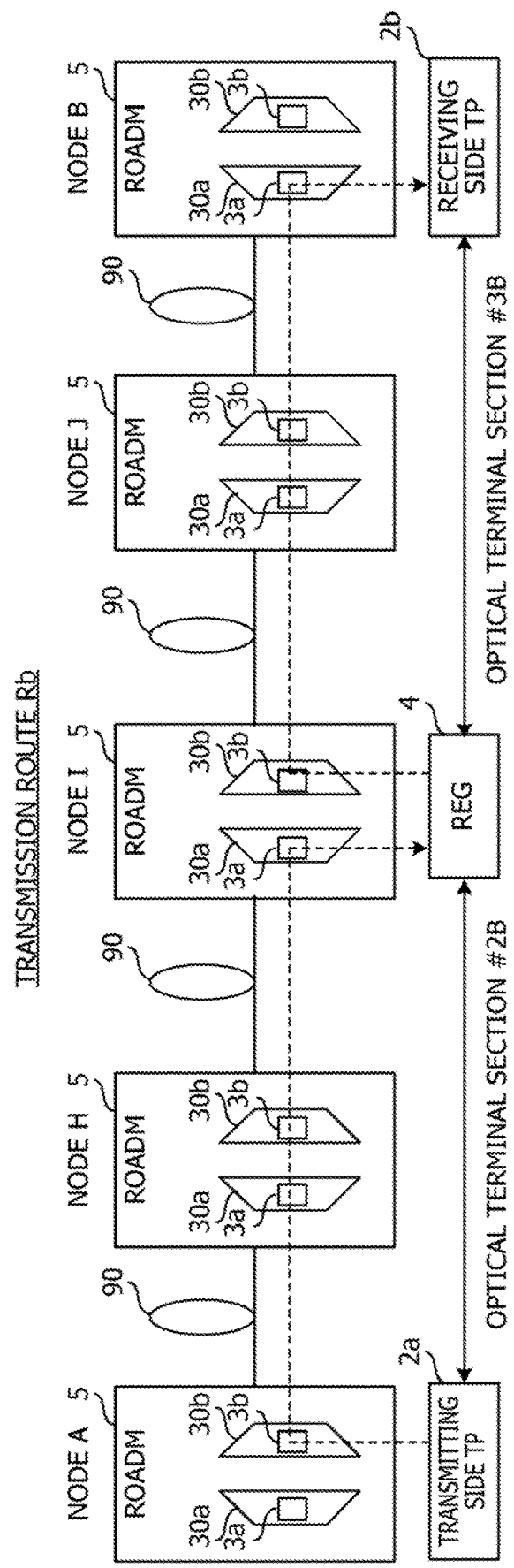
FIG. 21 is a diagram illustrating a transmission route divided into a plurality of optical terminal sections.

FIG. 21 is a diagram illustrating the transmission route Rb divided into a plurality of optical terminal sections #2B and #3B. For example, assuming that the REG 4 is provided at the node I that is an intermediate point of the transmission route Rb, the communication setting selection unit 104 sets the optical terminal sections #2B and #3B with the REG 4 as a boundary. The optical terminal section #2B is a section from the transmitting side TP 2a of the start node A to the REG 4 of the node I, and the optical terminal section #3B is a section from the REG 4 of the node I to the receiving side TP 2b of the end node B. The following description refers to FIG. 21.

The communication setting selection unit 104 selects the optical terminal section #2B (step St11c). Next, the PBN calculation unit 103 counts four, which is the number of the WSSs 30a and 30b, as the number of the wavelength filters 3a and 3b in the optical terminal section #21 (step St12). Next, the PBN calculation unit 103 calculates 60 (GHz) as the narrowed bandwidth B (step St13).

Next, the communication setting selection unit 104 selects the respective operation modes with the operation mode numbers #1 to #11 corresponding to the requested line rate of 200 (Gbps) among the operation modes in the communication setting DB 132 (step St14). Next, the communication setting selection unit 104 selects respective operation modes with the operation mode numbers #2 to #11 in which the band limit values Bo are equal to or less than 60 (GHz) of the narrowed bandwidth B (corresponding to the first combination) among the operation modes with the operation mode numbers #1 to #11 (step St15).

Next, the communication setting selection unit 104 selects the operation mode with the operation mode number #2 having the smallest OSNR tolerance (corresponding to the second combination) among the respective operation modes with the operation mode numbers #2 to #11 (step St16). Next, the communication setting selection unit 104 calculates the receiving side Q factor according to the mode parameters and the baud rate of the operation mode with the operation mode number #2 (step St17). It is assumed that the receiving side Q factor is 10 (dB).

Next, the communication setting selection unit 104 compares the receiving side Q factor with the threshold TH (step St18). When the threshold TH is 7 (dB), since the receiving side Q factor≥the threshold TH is satisfied (Yes in step St18), the communication setting selection unit 104 determines that the optical signal may be transmitted to the optical terminal section #2B, and ends the process related to the optical terminal section #2B.

Next, since there is the unselected optical terminal section #38 (Yes in step St20), the communication setting selection unit 104 selects the optical terminal section #3B (step St11c). Next, the PBN calculation unit 103 counts four, which is the number of the WSSs 30a and 30b, as the number of the wavelength filters 3a and 38 in the optical terminal section #3B (step St12). Next, the PBN calculation unit 103 calculates 60 (GHz) as the narrowed bandwidth B (step St13).

Next, the communication setting selection unit 104 selects the respective operation modes with the operation mode numbers #1 to #11 corresponding to the requested line rate of 200 (Gbps) among the operation modes in the communication setting DB 132 (step St14). Next, the communication setting selection unit 104 selects respective operation modes with the operation mode numbers #2 to #11 in which the band limit values Bo are equal to or less than 60 (GHz) of the narrowed bandwidth B (corresponding to the first combination) among the operation modes with the operation mode numbers #1 to #11 (step St15).

Next, the communication setting selection unit 104 selects the operation mode with the operation mode number #2 having the smallest OSNR tolerance (corresponding to the second combination) among the respective operation modes with the operation mode numbers #2 to #11 (step St16). Next, the communication setting selection unit 104 calculates the receiving side Q factor according to the mode parameters and the baud rate of the operation mode of the operation mode number #2 (step St17a). It is assumed that the receiving side Q factor is 10 (dB).

Next, the communication setting selection unit 104 compares the receiving side Q factor with the threshold TH (step St18). When the threshold TH is 7 (dB), since the receiving side Q factor≥the threshold TH is satisfied (Yes in step St18), the communication setting selection unit 104 determines that the optical signal may be transmitted to the optical terminal section #3B, and ends the process related to the optical terminal section #3B.

Next, since there is no other optical terminal section (No in step St20) and there is no unselected transmission route (No in step St21), the communication setting selection unit 104 selects the transmission route Ra having the smallest number of optical terminal sections (step St22). For example, the communication setting selection unit 104 selects the transmission route having the smallest REG 4 on the transmission routes Ra and Rb. This reduces the installation cost of the REG 4. The transmission route information of the transmission routes Ra and Rb designed in this way is registered in the transmission route DB 131.

Next, the setting processing unit 105 executes setting of the transmission routes Ra and Rb for the WDM network 91 (step St23), and executes the communication setting of the operation mode for each of the transmission routes Ra and Rb for the TPs 2 (the transmitting side TP 2a and the receiving side TP 2b) and the REG 4 (step St24).

As described above, the communication setting selection unit 104 acquires the receiving side Q factor of the optical signal according to the mode parameters and the baud rate of the operation mode selected based on the OSNR tolerance, and selects one of the transmission routes Ra and Rb based on the receiving side Q factor. Therefore, the network management device 1 may select the transmission route Ra having the best transmission quality from the plurality of transmission routes Ra and Rb.

The communication setting selection unit 104 divides the transmission route Rb in which the receiving side Q factor is less than the predetermined threshold TH into a plurality of optical terminal sections #2B and #38 in which each the receiving side Q factor is equal to or greater than the predetermined threshold TH, and selects the transmission route Ra having the smallest number of optical terminal sections from the transmission routes Ra and Rb. Therefore, the network management device 1 may design the WDM network 91 so as to reduce the installation cost of the REG 4.

As described above, the Q factor is used as an index value related to the receiving side quality of the optical signal. Note that the GMI or NGMI calculated by the monitor circuit 201b may also be used as the index value.

Figure 22A:
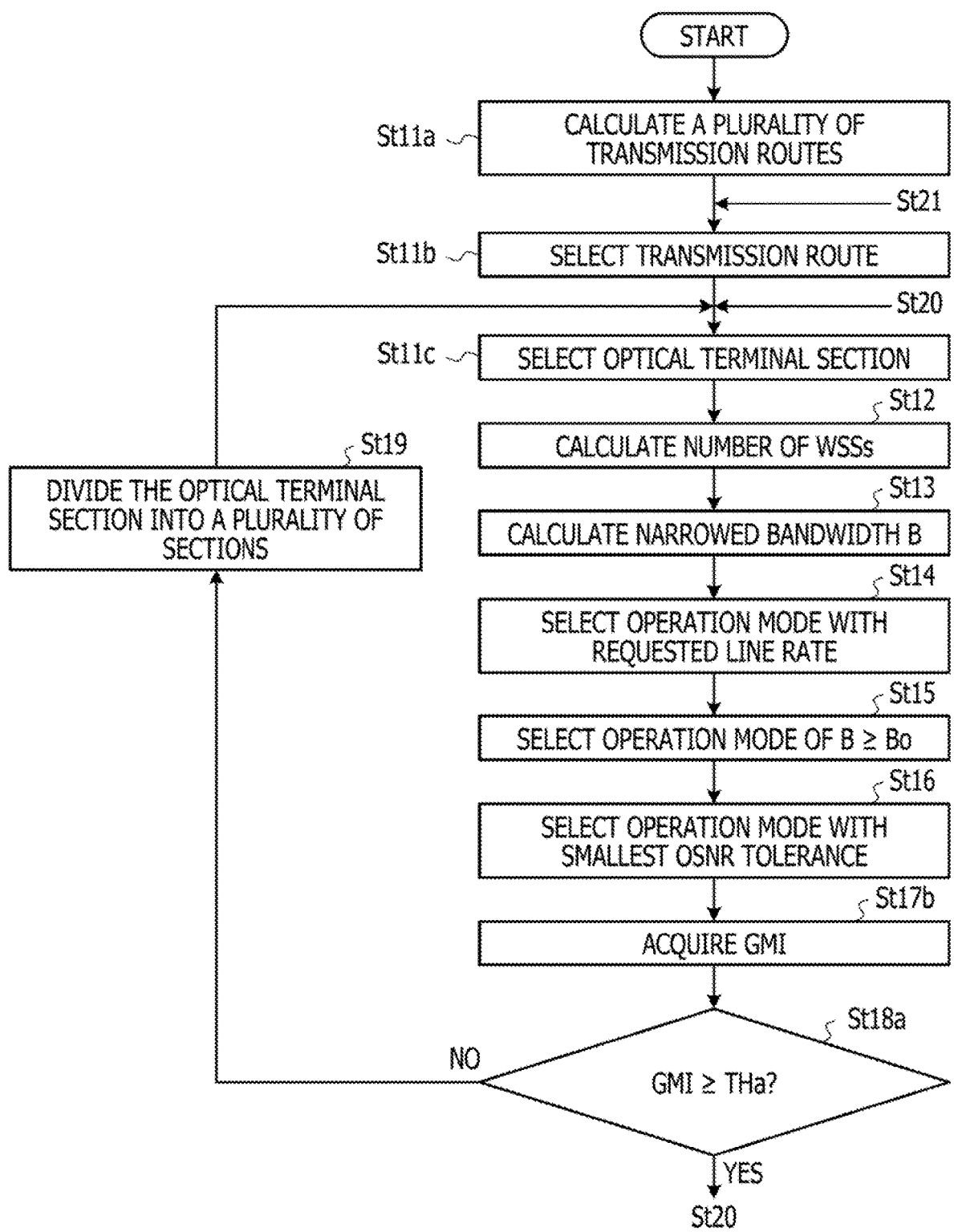
FIG. 22A is a flowchart illustrating an example of a communication setting process when another index value is used.
Figure 22B:
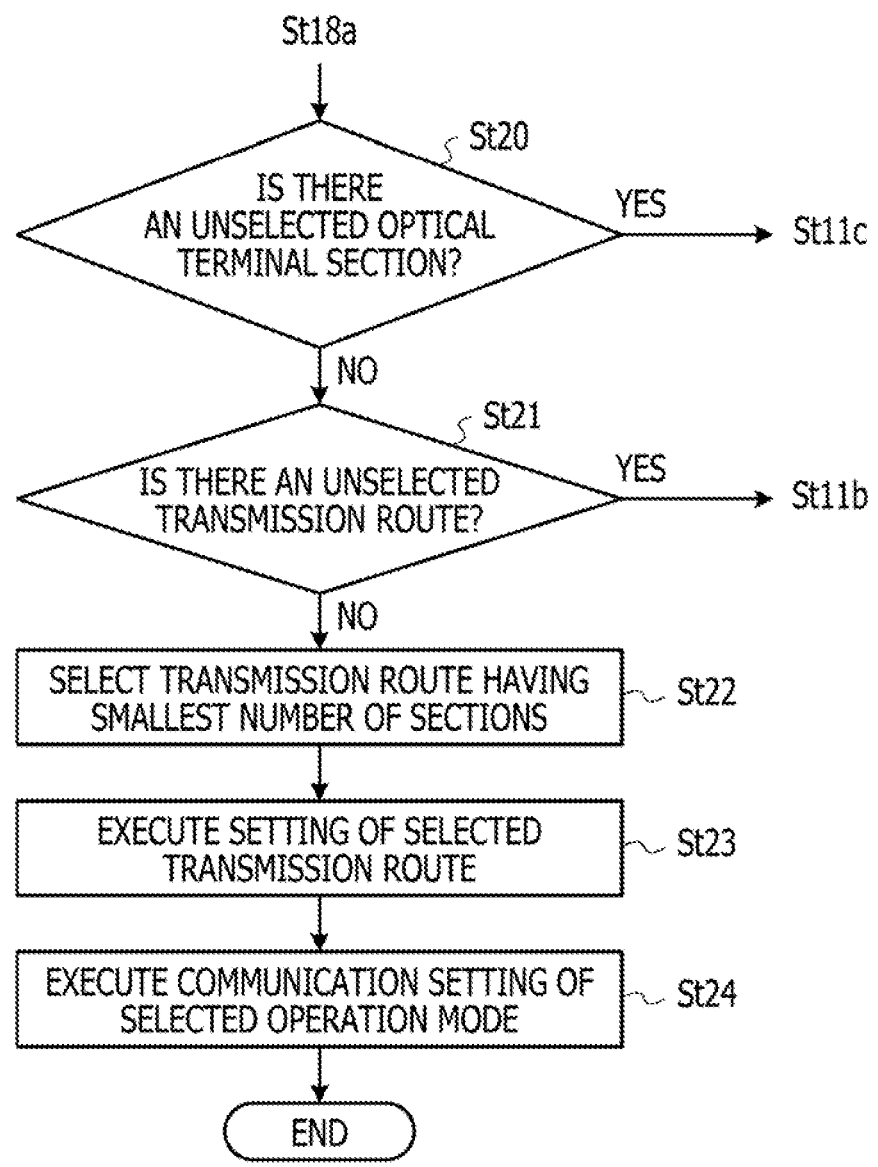
FIG. 22B is a flowchart illustrating an example of a communication setting process when another index value is used.

FIG. 22A to 22B is a flowchart illustrating an example of the communication setting process when another index value is used. In FIG. 22A to 22B, processes in common with FIG. 18A to 18B are denoted by the same reference symbols, and the explanation thereof is omitted.

The communication setting selection unit 104 acquires the GMI as the index value from the monitor circuit 201b instead of the Q factor (step St17b). For example, in a case where the degree of multilevel of the optical signal is 4.0, the GMI indicates the maximum value of 4.0 when the transmission quality of the optical signal is the best. In order to acquire the GMI, the setting processing unit 105 temporarily sets the selected transmission route for the WDM network 91, and executes the communication setting of the selected operation mode for the TP 2 and the REG 4.

Next, the communication setting selection unit 104 compares the acquired GMI with a threshold THa (step St18a). It is assumed that the threshold THa is, for example, 3.8. When GMI≥THa (Yes in step St18a), each of the processes in step St20 and subsequent steps is executed, and when GMI<THa (No in step St18), each of the processes in step St19 and subsequent steps is executed.

In steps St17b and St18a, the NGMI may be used instead of the GMI. The NGMI is, for example, a value obtained by normalizing the degree of multilevel of the optical signal, and indicates the maximum value of 1.0 when the transmission quality of the optical signal is the best. Therefore, the threshold THa is set to 0.95, for example.

As described above, even when the GMI or NGMI is used as the index value, a similar effect as when the Q factor is used may be obtained.

Third Embodiment

In the first and second embodiments, in the process of step St14, the operation mode with a line rate that matches the requested line rate is selected. However, in order to increase the transmission capacity of the optical signal, an operation mode with a line rate equal to or higher than the requested line rate may be selected.

Figure 23A:
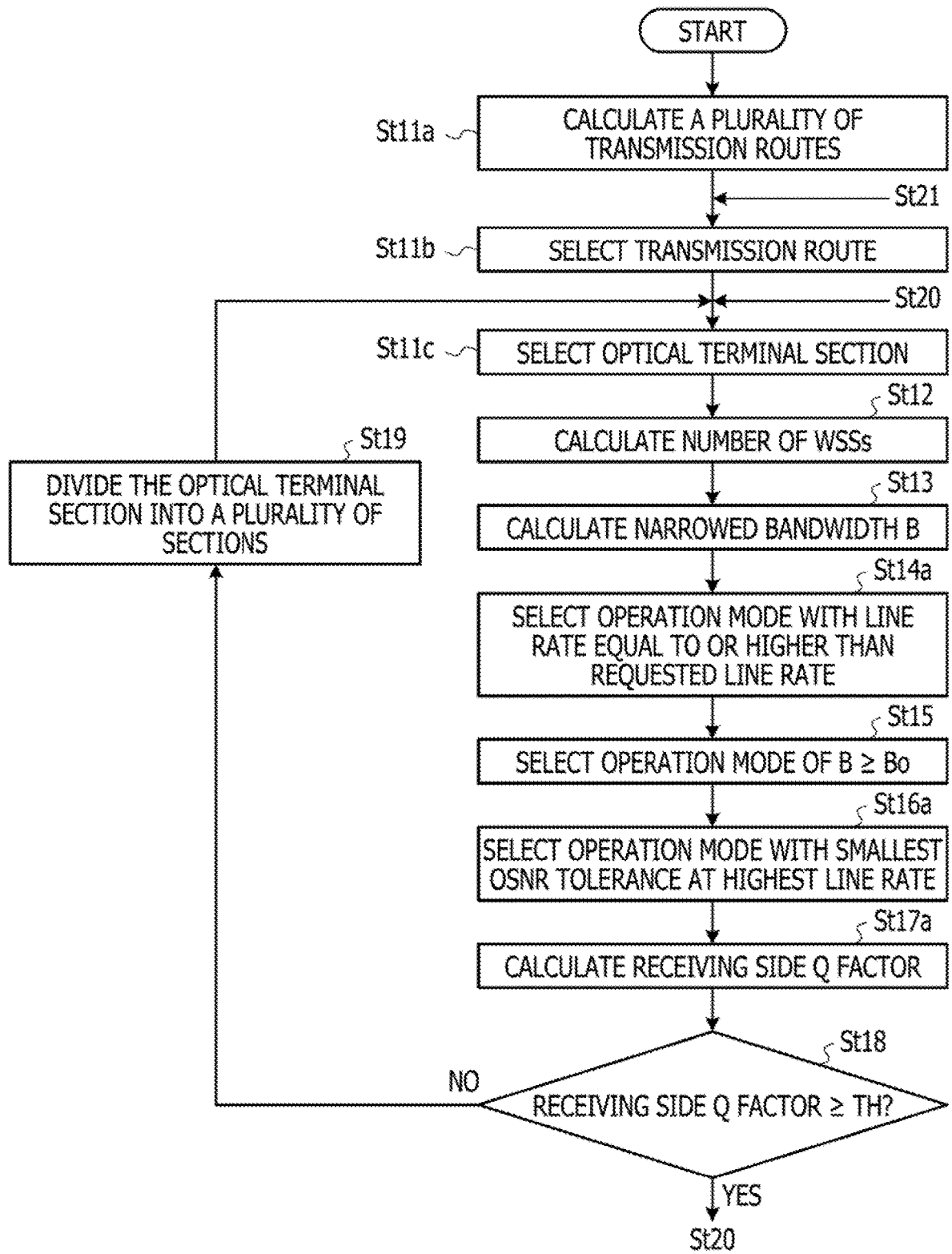
FIG. 23A is a flowchart illustrating a communication setting process according to a third embodiment.
Figure 23B:
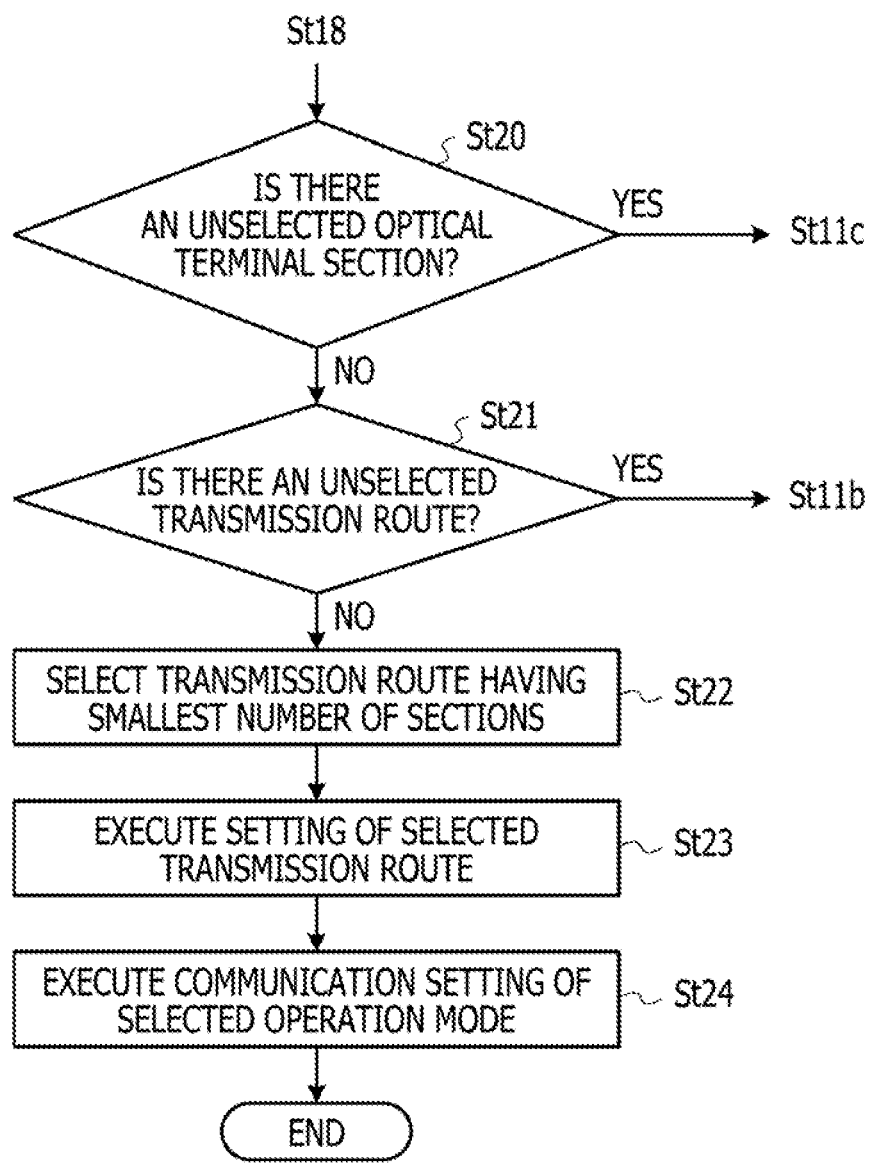
FIG. 23B is a flowchart illustrating a communication setting process according to a third embodiment.

FIG. 23A to 23B is a flowchart illustrating a communication setting process according to a third embodiment. In FIG. 23A to 23B, processes in common with FIG. 18A to 18B are denoted by the same reference symbols, and the explanation thereof is omitted.

After the process of step St13, the communication setting selection unit 104 selects the operation mode with a line rate equal to or higher than the requested line rate (step St14a). For example, when the requested line rate is 200 (Gbps), the respective operation modes of the operation mode numbers #1 to #26 are selected.

Next, the communication setting selection unit 104 selects an operation mode in which the band limit value Bo is equal to or less than the narrowed bandwidth B from the respective operation modes with the operation mode numbers #1 to #26 (step St5). For example, when the narrowed bandwidth B is 60 (GHz), the respective operation modes of the operation mode numbers #2 to #11, #14 to #18, and #22 to #26 are selected.

Next, the communication setting selection unit 104 selects the operation mode having the smallest OSNR tolerance among the operation modes with the operation mode numbers #22 to #26 having the highest line rate of 400 (Gbps) from the respective operation modes with the operation mode numbers #2 to #11, #14 to #18, and #22 to #26 (step St16a). In this manner, the communication setting selection unit 104 selects the operation mode by prioritizing the line rate over the OSNR tolerance, and thus it is possible to effectively increase the transmission capacity of the optical signal. When there is only one operation mode having the highest line rate of 400 (Gbps), that operation mode is selected.

Next, an operation example of the communication setting process of this example will be described.

Figure 24:
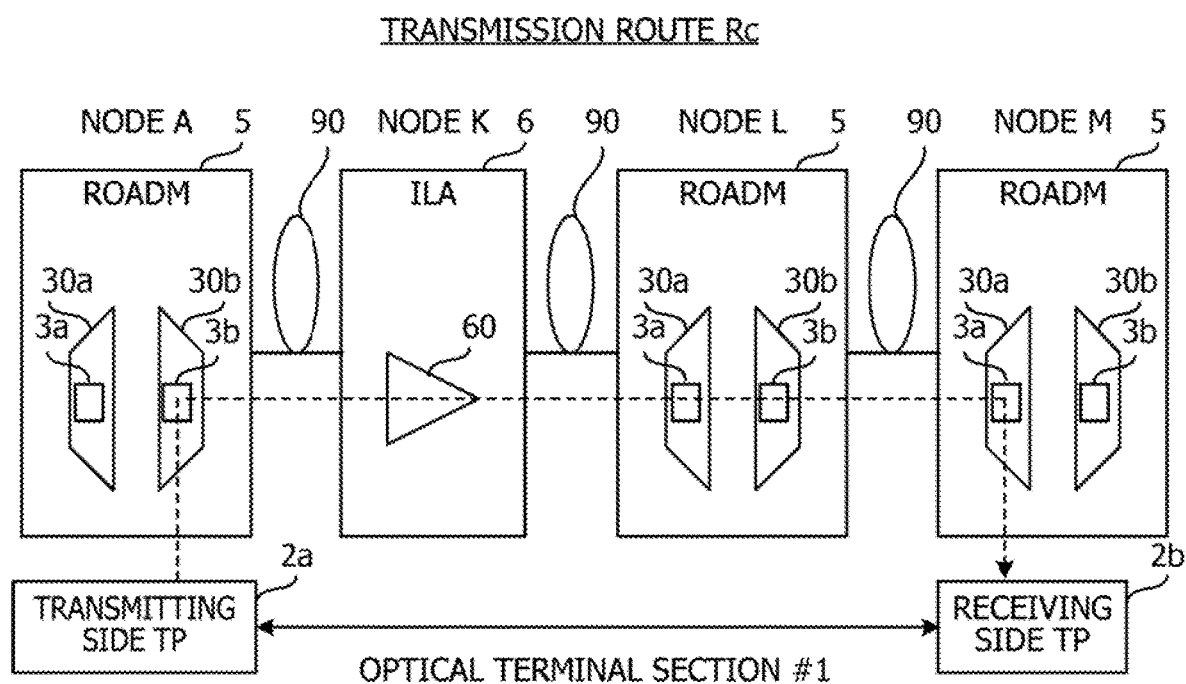
FIG. 24 is a diagram illustrating another example of a transmission route.

FIG. 24 is a diagram illustrating the transmission route Rc as another example. In FIG. 24, constituents common to those in FIG. 1 are denoted by the same reference numerals, and the explanation thereof is omitted.

The WDM network 91 includes nodes A, K, L, and M adjacent to each other. The node K is provided with the ILA 6, and the other nodes A, L, and M are provided with the ROADMs 5. It is assumed that the start node is the node A and the end node is the node M. The processing by the network management device 1 will be described below with reference to FIGS. 24 and 13 using the flowchart illustrated in FIG. 23A to 23B.

The route calculation unit 102 calculates the transmission route Rc in which the start node is the node A and the end node is the node M (step St11a). The communication setting selection unit 104 selects the transmission route Rc (step St11b), and then selects the optical terminal section #1 of the transmission route Rc (step St11c). Since the REG 4 is not provided on the transmission route Rc, there is only the optical terminal section #1 from the transmitting side TP 2a of the start node A to the end node M, and there is no other optical terminal section.

Next, the PBN calculation unit 103 counts four, which is the number of WSSs 30a and 30b, as the number of wavelength filters 3a and 3b on the transmission route Rc (step St12). Next, the PBN calculation unit 103 calculates 60 (GHz) as the narrowed bandwidth B (step St13).

Next, the communication setting selection unit 104 selects the respective operation modes with the operation mode numbers #1 to #26 corresponding to the line rate equal to or higher than 200 (Gbps) of the requested line rate among the operation modes in the communication setting DB 132 (step St14a). Next, the communication setting selection unit 104 selects the operation modes with the operation mode numbers #2 to #11, #14 to #18, and #22 to #26 in which the band limit values Bo are equal or less than 60 (GHz) of the narrowed bandwidth B (corresponding to the first combination) among the respective operation modes with the operation mode numbers #1 to #26 (step St15).

Next, the communication setting selection unit 104 selects the operation mode with the operation mode number #22 having the smallest OSNR tolerance (corresponding to the second combination) among the operation modes with the operation mode numbers #22 to #26 having the highest line rate of 400 (Gbps) from the respective operation modes with the operation mode numbers #2 to #11, #14 to #18, and #22 to #26 (step St16a). Next, the communication setting selection unit 104 calculates the receiving side Q factor according to the mode parameters and the baud rate of the operation mode of the operation mode number #22 (step St17a). It is assumed that the receiving side Q factor is 10 (dB).

Next, the communication setting selection unit 104 compares the receiving side Q factor with the threshold TH (step St18). When the threshold TH is 7 (dB), since the receiving side Q factor≥the threshold TH is satisfied (Yes in step St18), the communication setting selection unit 104 determines that the optical signal may be transmitted to the optical terminal section #1, and ends the process related to the optical terminal section #1.

Next, since there is no other optical terminal section (No in step St20) and there is no unselected transmission route (No in step St21), the communication setting selection unit 104 selects the transmission route Rc (step St22).

As described above, the communication setting selection unit 104 selects, from the communication setting DB 132, a combination of the operation mode and the baud rate in which the line rate is equal to or higher than the requested line rate. This increases the transmission capacity of the optical signal.

Also in this example, the GMI or NGMI may be used instead of the Q factor in steps St17a and St18. In this example, when there is a plurality of optical terminal sections, the operation mode of the same line rate is selected in the process of each optical terminal section (step St14a).

Fourth Embodiment

In the first to third embodiments, the baud rate is determined according to the operation mode selected based on the requested line rate and the OSNR tolerance. However, without being limited thereto, an operation mode having a low baud rate may be selected from the operation modes satisfying the requested line rate. When the operation mode with the low baud rate is selected, the bandwidth of the optical signal is narrowed, and thus optical signals of a larger number of wavelengths are wavelength-multiplexed by the wavelength-multiplexed signal light, thereby increasing the overall transmission capacity.

The lower the baud rate of the operation mode is, the larger the degree of multilevel is so that the requested line rate is satisfied. The larger the degree of multilevel is, the lower the OSNR tolerance is, and thus the OSNR tolerance is improved.

Figure 25A:
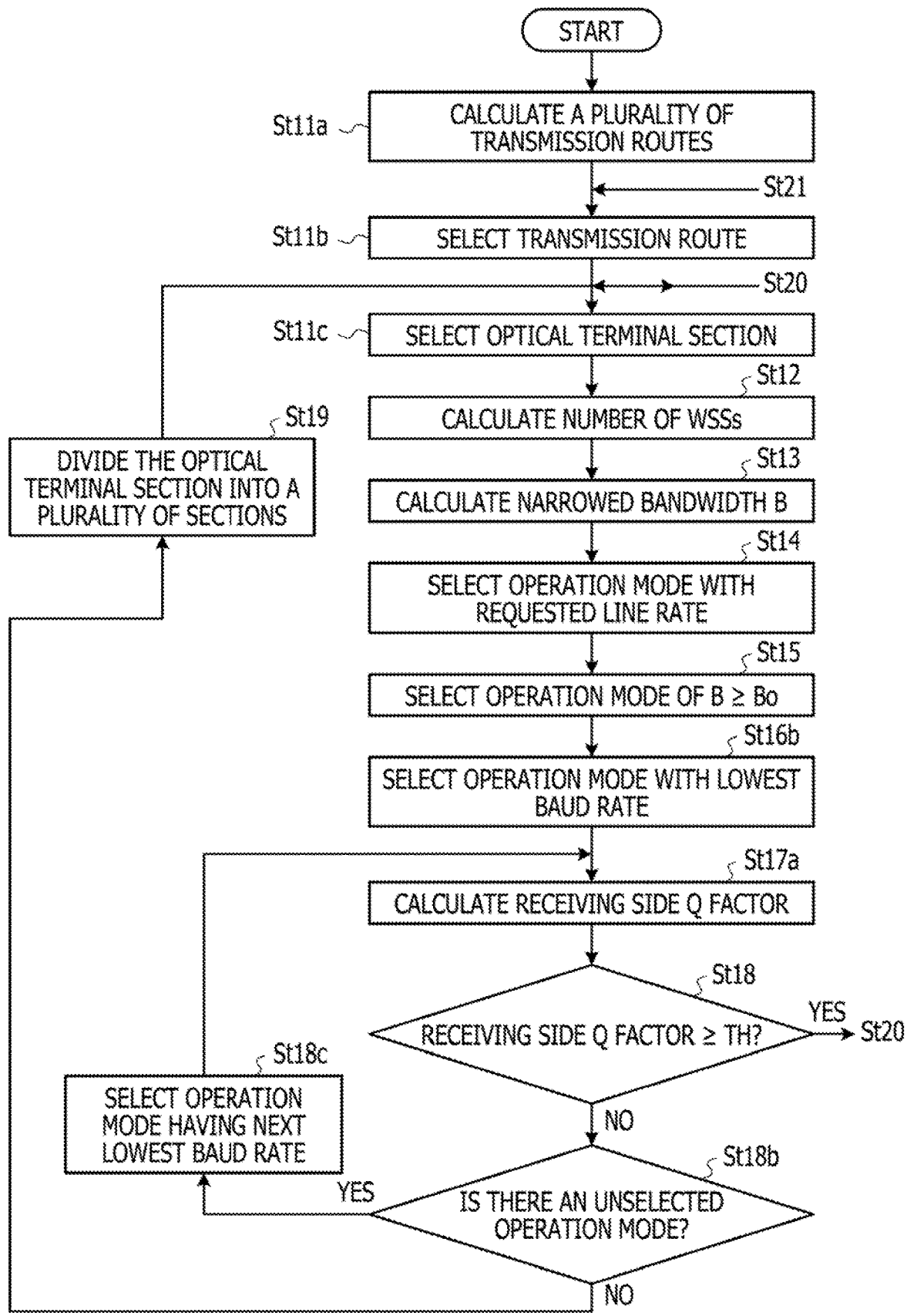
FIG. 25A is a flowchart illustrating a communication setting process according to a fourth embodiment.
Figure 25B:
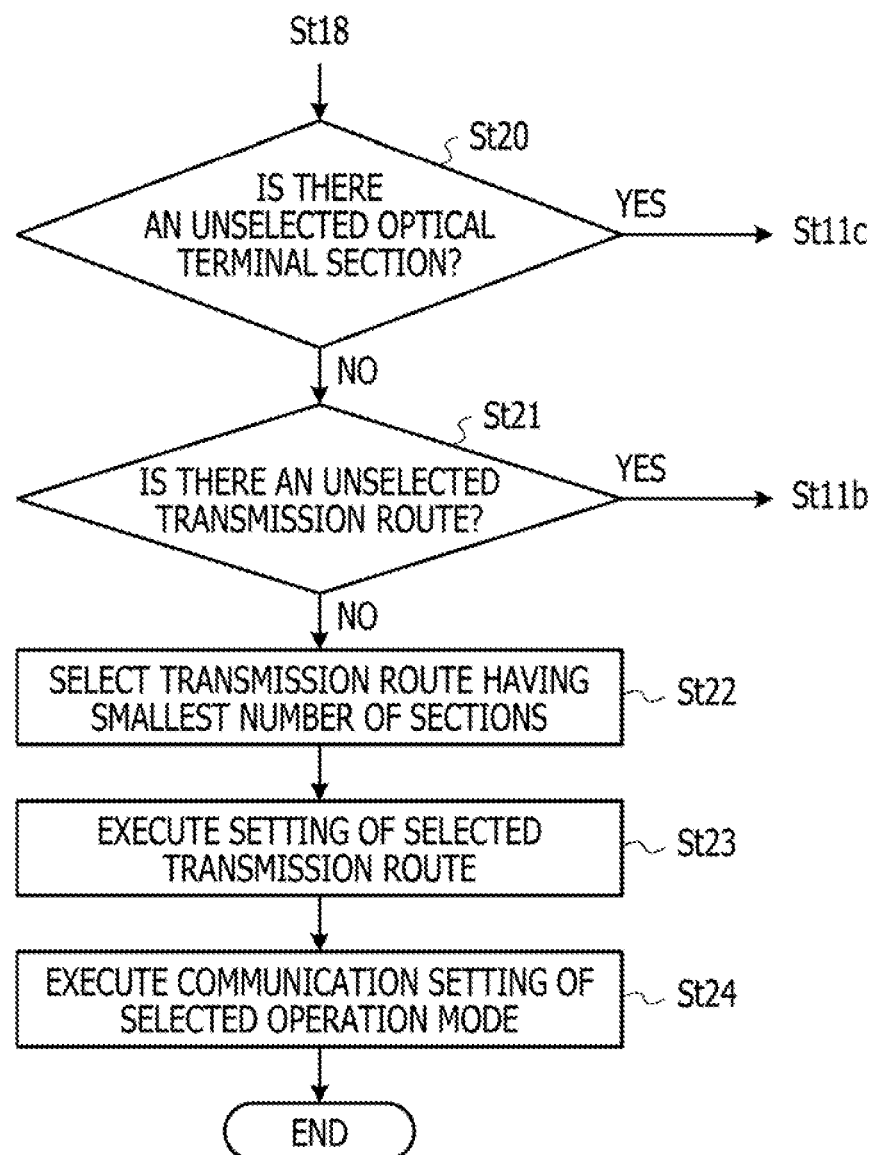
FIG. 25B is a flowchart illustrating a communication setting process according to a fourth embodiment.

FIG. 25A to 25B is a flowchart illustrating a communication setting process according to a fourth embodiment. In FIG. 25A to 25B, processes in common with FIG. 18A to 18B are denoted by the same reference symbols, and the explanation thereof is omitted.

After selecting the operation mode in which the band limit value Bo is equal to or less than the narrowed bandwidth B (step St15), the communication setting selection unit 104 selects the operation mode having the lowest baud rate among the operation modes (step St16b). For example, when the operation mode numbers #2 to #11 have been selected, the operation mode with the operation mode number #11 having the lowest baud rate (32 (Gbaud)) is selected.

Next, the Q factor calculation unit 106 calculates the receiving side Q factor according to the mode parameters and the baud rate of the selected operation mode (step St17a). Next, the communication setting selection unit 104 compares the receiving side Q factor with the threshold TH (step St18). When the receiving side Q factor is equal to or greater than the predetermined threshold TH (Yes in step St18), each of the processes in step St20 and subsequent steps is executed.

When the receiving side Q factor is less than the threshold TH (No in step St18), the communication setting selection unit 104 determines whether there is an unselected operation mode among the operation modes selected in step St15 (step St8b). When there is an unselected operation mode (Yes in step St18b), the communication setting selection unit 104 selects an operation mode with the next lowest baud rate (step St18c). Thereafter, each of the processes in step St17 and subsequent steps is executed. When there is no unselected operation mode (No in step St18b), each of the processes in step St19 and subsequent steps is executed.

As described above, the communication setting selection unit 104 sequentially selects the operation modes in ascending order of the baud rate, and applies the operation mode satisfying the condition of the receiving side Q factor to the optical terminal section. An operation example will be described below.

For example, it is assumed that the transmission route Ra illustrated in FIG. 20 is calculated in the process of step St11a and the narrowed bandwidth B of the four WSSs 30a and 30b of the transmission route Ra is calculated as 60 (GHz) in the process of step St3. In this case, in the process of step St14, the operation mode numbers #1 to #11 of the requested line rate of 200 (Gbps) are selected. In the process of step St15, the operation modes with the operation mode numbers #2 to #11 in which the band limit values Bo are equal or less than 60 (GHz) of the narrowed bandwidth B (corresponding to the first combination) are selected.

The communication setting selection unit 104 selects the operation mode with the operation mode number #11 having the minimum baud rate (step St16b). The communication setting selection unit 104 determines that the receiving side Q factor≥TH is not satisfied for the selected operation mode (No in step St18), and since there are operation modes with the remaining operation mode numbers #2 to #10 (Yes in step St18b), the communication setting selection unit 104 selects the operation mode with the operation mode number #10 having the next lower baud rate (step St18c).

Next, the communication setting selection unit 104 also performs the processes of steps St17, St18, St18b, and St18c for the operation mode with the operation mode number #10. This series of processes is sequentially repeated for each operation mode with the operation mode numbers #9, #8, . . . , #4, and the operation mode with the operation mode number #2 finally satisfies the condition of the receiving side Q factor (Yes in step St18). Therefore, the operation mode with the operation mode number #2 is applied to the transmission route Ra. When there is a plurality of transmission routes, the communication setting selection unit 104 selects the operation mode so that the baud rates of respective transmission routes are the same. Also in this example, the GMI or NGMI may be used instead of the Q factor in steps St17 and St18.

As described above, the communication setting selection unit 104 selects the first combination in which the narrowed bandwidth B is equal to or smaller than the band limit value Bo from the combinations of the degree of multilevel and the baud rate based on the communication setting DB 132, and selects the second combination from the first combination based on the baud rate. The setting processing unit 105 sets the degree of multilevel and the baud rate of the second combination in TP 2.

Therefore, when a combination with the low baud rate is selected, the bandwidth of the optical signal is narrowed, so that optical signals of a larger number of wavelengths are wavelength-multiplexed by the wavelength-multiplexed signal light, thereby increasing the overall transmission capacity. In the combination of the baud rate and the degree of multilevel, the lower the baud rate of the operation mode is, the larger the degree of multilevel is so that the requested line rate is satisfied. The larger the degree of multilevel is, the lower the OSNR tolerance is, and thus the OSNR tolerance is improved.

Therefore, the communication setting selection unit 104 may select a suitable operation mode from the viewpoint of pass band narrowing and OSNR. Since the degree of multilevel of the operation mode has digits after the decimal point, as described with reference to FIG. 5, the number of options of the degree of multilevel satisfying the conditions of the pass band narrowing and the OSNR is increased, and the transmission distance may be extended. Therefore, the network management device 1 may perform the appropriate network design in consideration of the pass band narrowing, the OSNR, and the transmission distance.

It is possible to accomplish the processing functions described above using a computer. In that case, a program describing the processing contents of the functions to be possessed by a processing device is provided. By executing the program using a computer, the processing functions described may be achieved by the computer. It is possible to store the program in which the processing contents are written in a computer-readable recording medium (excluding a carrier wave).

In a case of distributing a program, the program is sold in the form of, for example, a portable recording medium such as a digital versatile disc (DVD) or a compact disc read-only memory (CD-ROM) containing the program recorded therein. The program may be stored in a storage device of a server computer, and the program may be forwarded from the server computer to another computer via a network.

For example, the computer for executing the program stores in its own storage device the program recorded in the portable recording medium or the program forwarded from the server computer. The computer reads the program from its own storage device to execute the processing according to the program. The computer may read the program directly from the portable recording medium to execute the processing according to the program. The computer may also sequentially execute the processing following the received program each time the program is forwarded from the server computer.

The foregoing embodiments are preferred embodiments of the present disclosure. However, the embodiments are not limited to these, and various modifications may be made without departing from the scope of the disclosure.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A network system comprising:
    a first device configured to:
        determine a modulation scheme based on a degree of multilevel and a variable baud rate, and
        transmit an optical signal; and
    a second device coupled to the first device, and configured to:
        calculate a bandwidth of the optical signal narrowed by a wavelength filter from the number of wavelength filters on a transmission route of the optical signal,
        select, based on a plurality of combinations of the degree of multilevel and the baud rate according to a transmission rate of the optical signal, and a correspondence between a lower limit value of a bandwidth of the optical signal and a lower limit value of an optical signal to noise ratio (OSNR) for maintaining predetermined quality of the optical signal when the degree of multilevel and the baud rate are set in the first device, one or more first combinations in each of which the lower limit value of the bandwidth is equal to or less than the bandwidth of the narrowed optical signal from the plurality of combinations,
        select a second combination from the one or more first combinations based on the lower limit value of the OSNR or the baud rate, and
        set the degree of multilevel and the baud rate of the second combination in the first device.

2. The network system according to claim 1, wherein
    the degree of multilevel has digits after a decimal point, and
    a multilevel modulation scheme with the degree of multilevel is a multilevel modulation scheme using probabilistic shaping.

3. The network system according to claim 2, wherein
    each of the plurality of combinations includes a basic modulation scheme, the degree of multilevel, and the baud rate, each of which is a basis for a probabilistic shaping process, and
    the second device sets the basic modulation scheme, the degree of multilevel, and the baud rate of the second combination in the first device, and
    the first device determines a modulation scheme based on the basic modulation scheme, the degree of multilevel, and the baud rate to transmit the optical signal.

4. The network system according to claim 1, wherein
    the second device selects the first combination in which the transmission rate is equal to or more than a predetermined value from the plurality of combinations.

5. The network system according to claim 4, wherein
    the second device selects the second combination that has a highest transmission rate from the one or more first combinations.

6. The network system according to claim 5, wherein
    the second device selects the second combination in which the lower limit value of the OSNR is smallest from the one or more first combinations.

7. The network system according to claim 1, wherein the second device calculates a plurality of transmission routes through each of which the optical signal is transmitted, and the second device is further configured to:
    calculate a bandwidth of the optical signal after being narrowed by the wavelength filter for each of the plurality of transmission routes, for each of the plurality of transmission routes,
    select the one or more first combinations from the plurality of combinations,
    select the second combination from the one or more first combinations based on the lower limit value of the OSNR,
    acquire an index value regarding receiving side quality of the optical signal following the selected second combination, and
    select one of the plurality of transmission routes based on the index value.

8. The network system according to claim 7, wherein the second device is further configured to:
    divide a transmission route in which the index value is less than a predetermined threshold among the plurality of transmission routes into a plurality of optical terminal sections in each of which the index value is equal to or more than the predetermined threshold and the optical signal is terminated, and
    selects a transmission route that has the smallest number of the plurality of optical terminal sections among the plurality of transmission routes.

9. A management device coupled to transmission device, the transmission device configured to transmit an optical signal, the management device comprising:
a memory; and
a processor coupled to memory and configured to:
calculate a bandwidth of the optical signal narrowed by a wavelength filter from the number of wavelength filters on a transmission route of the optical signal,
select, based on a plurality of combinations of a degree of multilevel and a baud rate according to a transmission rate of the optical signal, and a correspondence between a lower limit value of a bandwidth of the optical signal and a lower limit value of an optical signal to noise ratio (OSNR) for maintaining predetermined quality of the optical signal when the degree of multilevel and the baud rate are set in the transmission device, one or more first combinations in each of which the lower limit value of the bandwidth is equal to or less than the bandwidth of the narrowed optical signal from the plurality of combinations,
select a second combination from the one or more first combinations based on the lower limit value of the OSNR or the baud rate, and
set the degree of multilevel and the baud rate of the second combination in the transmission device.

10. The management device according to claim 9, wherein
the degree of multilevel has digits after a decimal point, and
a multilevel modulation scheme with the degree of multilevel is a multilevel modulation scheme using probabilistic shaping.

11. The management device according to claim 10, wherein
each of the plurality of combinations includes a basic modulation scheme, the degree of multilevel, and the baud rate, each of which is a basis for a probabilistic shaping process, wherein
the processor sets the basic modulation scheme, the degree of multilevel, and the baud rate of the second combination in the transmission device.

12. The management device according to claim 9, wherein
the processor selects the first combination in which the transmission rate is equal to or more than a predetermined value from the plurality of combinations.

13. The management device according to claim 12, wherein
the processor selects the second combination that has a highest transmission rate from the one or more first combinations.

14. The management device according to claim 13, wherein the processor selects the second combination in which the lower limit value of the OSNR is smallest from the one or more first combinations.

15. The management device according to claim 9, wherein, the processor further configured to:
calculate a plurality of transmission routes through each of which the optical signal is transmitted,
calculate a bandwidth of the optical signal after being narrowed by the wavelength filter for each of the plurality of transmission routes,
for each of the plurality of transmission routes, select the one or more first combinations from the plurality of combinations,
select the second combination from the one or more first combinations based on the lower limit value of the OSNR, and acquires an index value regarding receiving side quality of the optical signal following the selected second combination, and
select one of the plurality of transmission routes based on the index value.

16. The management device according to claim 15, wherein the processor is further configured to:
divide a transmission route in which the index value is less than a predetermined threshold among the plurality of transmission routes into a plurality of optical terminal sections in each of which the index value is equal to or more than the predetermined threshold and the optical signal is terminated, and
select a transmission route that has the smallest number of the plurality of optical terminal sections among the plurality of transmission routes.

17. A network design method, comprising:
calculating a bandwidth of an optical signal narrowed by a wavelength filter from the number of wavelength filters on a transmission route of the optical signal transmitted by a transmission device based on a degree of multilevel that has digits after a decimal point and a variable baud rate;
selecting, based on a plurality of combinations of the degree of multilevel and the baud rate according to a transmission rate of the optical signal, and a correspondence between a lower limit value of a bandwidth of the optical signal and a lower limit value of an optical signal to noise ratio (OSNR) for maintaining predetermined quality of the optical signal when the degree of multilevel and the baud rate are set in the transmission device, one or more first combinations in each of which the lower limit value of the bandwidth is equal to or less than a bandwidth of the narrowed optical signal from the plurality of combinations,
selecting a second combination from the one or more first combinations based on the lower limit value of the OSNR or the baud rate; and
setting the degree of multilevel and the baud rate of the second combination in the transmission device.

* * * * *